(12) United States Patent
Asayama et al.

(10) Patent No.: US 9,331,450 B2
(45) Date of Patent: May 3, 2016

(54) LASER APPARATUS

(71) Applicant: Gigaphoton Inc., Oyama-shi, Tochigi (JP)

(72) Inventors: Takeshi Asayama, Oyama (JP); Hakaru Mizoguchi, Oyama (JP); Kouji Kakizaki, Oyama (JP); Hiroaki Tsushima, Oyama (JP); Osamu Wakabayashi, Oyama (JP); Kazuya Takezawa, Oyama (JP)

(73) Assignee: GIGAPHOTON INC., Tochigi (JP)

( * ) Notice: Subject to any disclaimer, the term of this patent is extended or adjusted under 35 U.S.C. 154(b) by 0 days.

(21) Appl. No.: 14/663,086

(22) Filed: Mar. 19, 2015

(65) Prior Publication Data
US 2015/0194781 A1 Jul. 9, 2015

Related U.S. Application Data

(63) Continuation of application No. PCT/JP2013/075311, filed on Sep. 19, 2013.

(30) Foreign Application Priority Data

Sep. 21, 2012 (JP) .................... 2012-208716

(51) Int. Cl.
| | | |
|---|---|---|
| *H01S 3/097* | (2006.01) | |
| *H01S 3/038* | (2006.01) | |
| *H01S 3/225* | (2006.01) | |
| *H01S 3/034* | (2006.01) | |
| *H01S 3/08* | (2006.01) | |
| *H01S 3/104* | (2006.01) | |
| *H01S 3/036* | (2006.01) | |

(52) U.S. Cl.
CPC ............... *H01S 3/038* (2013.01); *H01S 3/034* (2013.01); *H01S 3/08009* (2013.01); *H01S 3/104* (2013.01); *H01S 3/225* (2013.01); *H01S 3/2251* (2013.01); *H01S 3/2256* (2013.01); *H01S 3/036* (2013.01); *H01S 3/0388* (2013.01); *H01S 3/09702* (2013.01)

(58) Field of Classification Search
CPC ... H01S 3/038; H01S 3/0304; H01S 3/08009; H01S 3/2251; H01S 3/2256; H01S 3/104
See application file for complete search history.

(56) References Cited

U.S. PATENT DOCUMENTS

| | | | |
|---|---|---|---|
| 6,608,853 B1 * | 8/2003 | Yoshioka et al. ............... 372/87 |
| 7,856,044 B2 | 12/2010 | Sandstrom et al. | |
| 8,446,928 B2 | 5/2013 | Sandstrom et al. | |
| 8,526,481 B2 | 9/2013 | Sandstrom et al. | |

(Continued)

FOREIGN PATENT DOCUMENTS

| | | |
|---|---|---|
| JP | 63-229789 A | 9/1988 |
| JP | 1118467 U | 8/1989 |
| JP | 1118467 U | 10/1989 |
| JP | 06-029592 A | 2/1994 |

(Continued)

*Primary Examiner* — Yuanda Zhang
(74) *Attorney, Agent, or Firm* — Studebaker & Brackett PC

(57) ABSTRACT

A laser apparatus according to embodiments may include a laser chamber including a laser gain medium; a power source; a first electrode to which a voltage is applied from the power source and a second electrode that is grounded, the first and second electrodes being disposed in the laser chamber; and a connector connected to the power source, and supporting the first electrode in a way that allows the first electrode to move toward a side where the second electrode is disposed.

9 Claims, 37 Drawing Sheets

(56) References Cited

U.S. PATENT DOCUMENTS

2006/0007966 A1* 1/2006 Laughman et al. ............. 372/12
2007/0253459 A1* 11/2007 Sandstrom et al. ............. 372/87

FOREIGN PATENT DOCUMENTS

| JP | 2000244039 A | 9/2000 |
| JP | 2010525571 A | 7/2010 |

* cited by examiner

LASER APPARATUS

CROSS-REFERENCE TO RELATED APPLICATION

This application is a continuation of PCT International Application No. PCT/JP2013/075311 filed on Sep. 19, 2013 which claims the benefit of priority from Japanese Patent Application No. 2012-208716, filed on Sep. 21, 2012; the entire contents of which are incorporated herein by reference.

BACKGROUND

1. Technical Field

The present disclosure relates to a laser apparatus.

2. Related Art

In recent years, for a semiconductor exposure apparatus (hereinafter referred to as an exposure apparatus), a higher resolution is being required as miniaturization and integration of a semiconductor integrated circuit have been progressed. Therefore, wavelength-shortening of light outputted from an exposure apparatus has been developed. Generally, as an exposure apparatus, a gas laser apparatus is used instead of the traditional mercury lamp. For example, as a gas laser apparatus for exposure, a KrF excimer laser outputting an ultraviolet laser beam with 248 nm (nanometer) wavelength or an ArF excimer laser outputting an ultraviolet light beam with 193 nm wavelength may be used.

In a next generation exposure technology, an immersion exposure in which a gap between an exposure lens in an exposure apparatus and a wafer is filled with fluid has been put to practical use. In the immersion exposure, because refraction index between the exposure lens and the wafer is changed, an apparent wavelength of the exposure light source is shortened. In a case where an immersion exposure is conducted using an ArF excimer laser as an exposure light source, a wafer is irradiated with an ultraviolet light beam of which wavelength is equivalent to 134 nm. Such technique may be called as an ArF immersion exposure (or an ArF immersion lithography).

Natural oscillation amplitudes of a KrF excimer laser and an ArF excimer laser are wide such as about 350 to 400 pm (picometer). Therefore, when a projector lens is made by a material which transmits an ultraviolet light beam such as a KrF laser beam or an ArF laser beam, a chromatic distortion may occur. As a result, a resolution may be reduced. Therefore, a spectrum line width of a laser beam outputted from a gas laser apparatus should be narrowed to the extent a chromatic distortion can be ignored. In order to narrow a spectrum line width, in a laser resonator of a gas laser apparatus, a line narrow module (LNM) with a line narrowing element (an etalon, a grating, or the like) may be mounted. In the following, a laser apparatus of which a spectrum line width is narrowed may be called as a line narrowed laser apparatus.

SUMMARY

A laser apparatus according to an aspect of the present disclosure may include a laser chamber including a laser gain medium; a power source; a first electrode to which a voltage is applied from the power source and a second electrode that is grounded, the first and second electrodes being disposed in the laser chamber; and a connector connected to the power source, and supporting the first electrode in a way that allows the first electrode to move toward a side where the second electrode is disposed.

A laser apparatus according to another aspect of the present disclosure may include a laser chamber including a laser gain medium; a power source; a first electrode to which a voltage is applied from the power source and a second electrode that is grounded, the first and second electrodes being disposed in the laser chamber; and a connector supporting the second electrode in a way that allows the second electrode to move toward a side where the first electrode is disposed.

BRIEF DESCRIPTION OF THE DRAWINGS

Hereinafter, selected embodiments of the present disclosure will be described with reference to the accompanying drawings.

DETAILED DESCRIPTION

Figure 1:
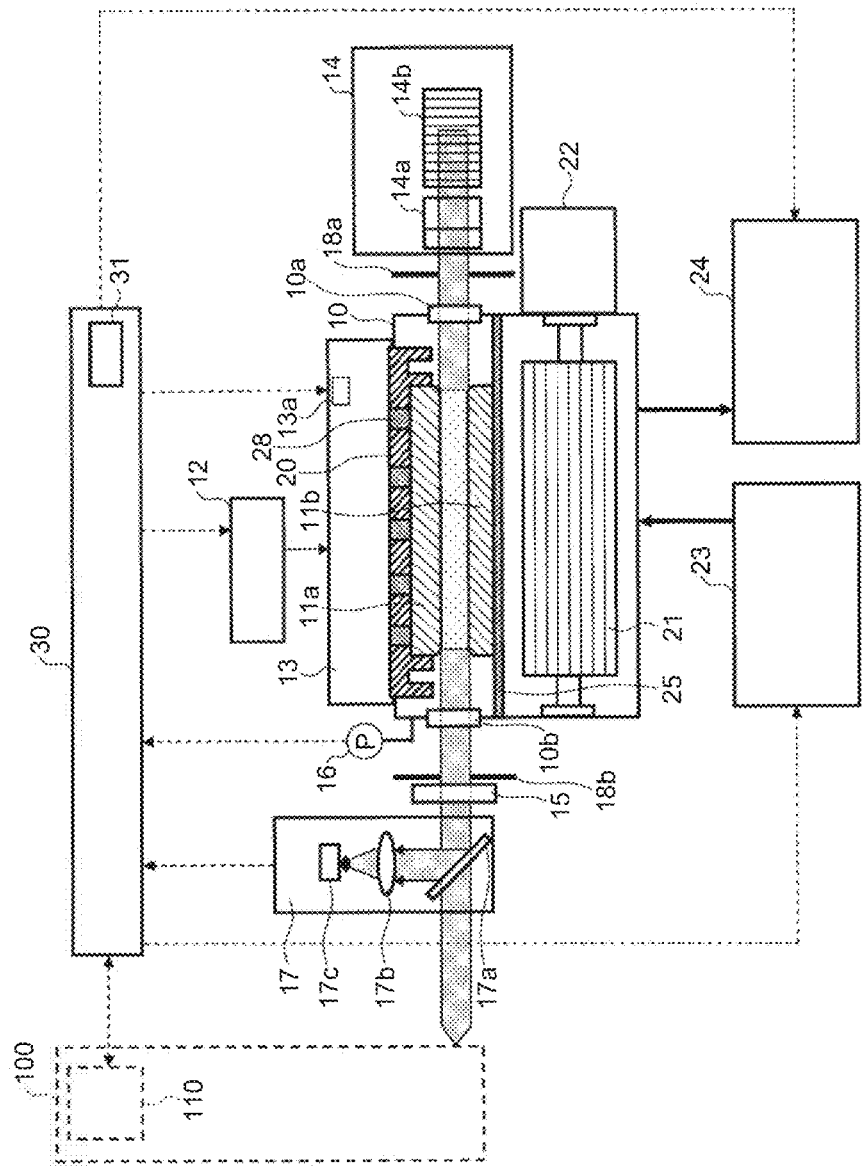
FIG. 1 is a structural diagram of a laser apparatus.

Hereinafter, selected embodiments of the present disclosure will be described in detail with reference to the accompanying drawings. The embodiments to be described below are merely illustrative in nature and do not limit the scope of the present disclosure. Further, the configuration(s) and operation(s) described in each embodiment are not all essential in implementing the present disclosure. Note that like elements are referenced by like reference numerals and characters, and duplicate descriptions thereof will be omitted herein. The embodiments of the present disclosure will be described following the table of contents below.

Contents
1. Excimer laser apparatus
   1.1 Agenda
   1.2 Structure
   1.3 Operation
   1.4 Structure of PPM and Operations of charger and PPM
   1.5 Structure and operation of laser chamber
   1.6 Abrasion of pair of electrodes
2. Laser apparatus with mechanism for moving electrode in discharge direction
3. Laser chamber with mechanism for moving electrode in discharge direction
   3.1 Structure
   3.2 Operation
   3.3 Effect
4. Explanation of connector of electrode in excimer laser apparatus
   4.1 First embodiment of connector
   4.2 Second embodiment of connector
   4.3 Third embodiment of connector
5. Explanation of electrode moving mechanism in excimer laser apparatus
   5.1 First embodiment of electrode moving mechanism
   5.2 Second embodiment of electrode moving mechanism
   5.3 Third embodiment of electrode moving mechanism
   5.4 Fourth embodiment of electrode moving mechanism
   5.5 Fifth embodiment of electrode moving mechanism
   5.6 Sixth embodiment of electrode moving mechanism
   5.7 Seventh embodiment of electrode moving mechanism
   5.8 Eighth embodiment of electrode moving mechanism
   5.9 Ninth embodiment of electrode moving mechanism
6. Control method of laser apparatus
   6.1 First control method of laser apparatus
   6.2 Second control method of laser apparatus
   6.3 Third control method of laser apparatus
   6.4 Fourth control method of laser apparatus
7. Supplemental explanations
   7.1 Pulse power module
   7.2 Laser chamber
   1. Excimer Laser Apparatus
   1.1 Agenda Generally, in a discharge excitation gas laser apparatus for a semiconductor exposure apparatus being an excimer laser apparatus, laser oscillation occurs by letting a pair of electrodes discharge by applying a high voltage between the pair of electrodes as they are disposed in a laser chamber including a laser gas to excite the laser gas.

Because the high voltage being a several dozen of kilo volts is applied between the pair of electrodes in order to let the discharge occur, surfaces of the electrodes are abraded by each discharge, and thereby, a distance between the pair of electrodes, i.e., a gap between the pair of electrodes becomes gradually wider. When the gap between the pair of electrodes becomes gradually wider, a discharge state in the laser chamber, or the like, changes, and thereby, it becomes impossible to obtain desired pulse energy of laser beams, or the like. In such case, if the gap between the pair of electrodes can be adjusted to a specific gap, it will be possible to use the laser chamber for a long time. However, conventionally, there is no feasible and easy method for adjusting a gap between a pair of electrodes to a specific gap. Therefore, such feasible and easy method for adjusting a gap between a pair of electrodes to a specific gap is required.

1.2 Structure

FIG. 1 shows an excimer laser apparatus being one aspect of the disclosure. The excimer laser apparatus may include a laser chamber 10, a charger 12, a pulse power module (PPM) 13, a laser resonator, an energy monitor unit 17 and a controller 30. In the following, a set of the charger 12 and the PPM 13 may be collectively referred to as a power source. The controller 30 may include a storage 31. The excimer laser apparatus may further include a laser gas supply 23 and a laser gas exhauster 24. In the disclosure, an excimer laser apparatus may be simply referred to as a laser apparatus.

The laser chamber 10 may include a pair of electrodes 11a and 11b, windows 10a and 10b capable of transmitting laser beams, and a pressure sensor 16. The laser chamber 10 may include laser gas being laser gain medium which is supplied from the laser gas supply 23, or the like. In the disclosure, one of the electrodes 11a and 11b may be referred to as a first electrode 11a, and the other may be referred to as a second electrode 11b.

A part of the laser chamber 10 may be constructed by an insulator 20 formed of insulating material. The first electrode 11a may be disposed at a side where the insulator 20 is disposed.

The laser resonator may include a line narrowing module (LNM) 14 and an output coupler (OC) 15. The laser resonator can include a high reflection mirror (HR) instead of the LNM 14. The laser chamber 10 may be disposed on a light path of the laser resonator.

Between the window 10a and the LNM 14, a slit 18a may be disposed, and between the window 10b and the OC 15, a slit 18b may be disposed.

The LNM 14 may include a prism 14a and a grating 14b. The prism 14a may expand a width of a laser beam. The grating 14b may be arranged in Littrow so that the laser apparatus oscillates at a target wavelength.

The OC 15 may be a partial reflection mirror capable of reflecting a part of a laser beam and transmitting another part of the laser beam.

The energy monitor unit 17 may include a beam splitter 17a which is disposed on a light path of a laser beam having been passed through the OC 15, a collector lens 17b and an optical sensor 17c. In the disclosure, the optical sensor 17c may be also referred to as an energy detector.

The PPM 13 may include a capacitor, and be connected to the pair of electrodes 11a and 11b. The PPM 13 may include a switch 13a, and by applying a trigger signal from the controller 30 to the switch 13a, discharge may occur between the pair of electrodes 11a and 11b. The charger 12 may be connected to the capacitor in the PPM 13.

The laser gas included in the laser chamber 10 may include noble gas such as Ar and Kr, halogen gas such as $F_2$, Ne gas, He gas, or buffer gas being a mixed gas thereof.

Figure 2:
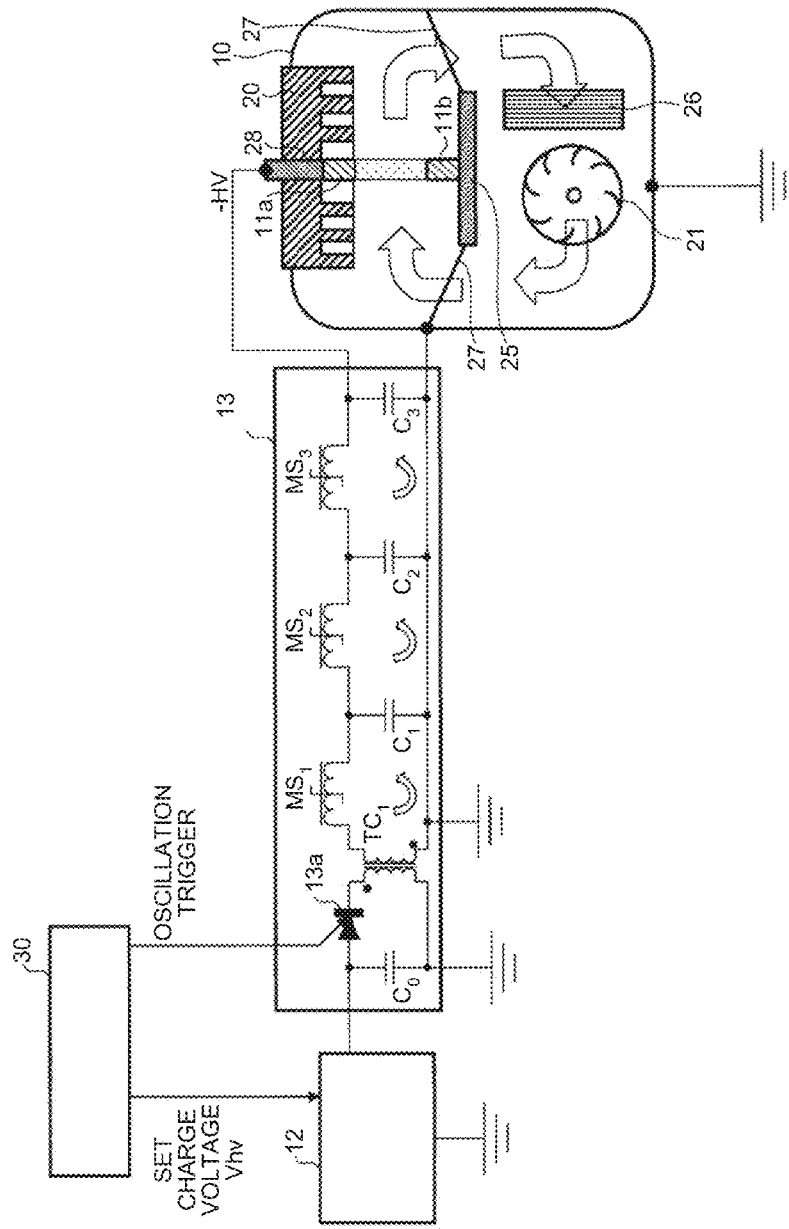
FIG. 2 is a structural diagram of a charger and a pulse power module.

As shown in FIG. 2, in the laser chamber 10, a cross flow fan 21 and a heat exchanger 26 may be disposed. Outside of the laser chamber 10, a motor 22 for rotating the cross flow fan 21 may be disposed.

The laser gas supply 23 may include valves and flow control valves. The laser gas supply 23 may be connected to a gas cylinder including laser gas.

The laser gas exhauster 24 may include valves and an exhaust pump.

Figure 5:
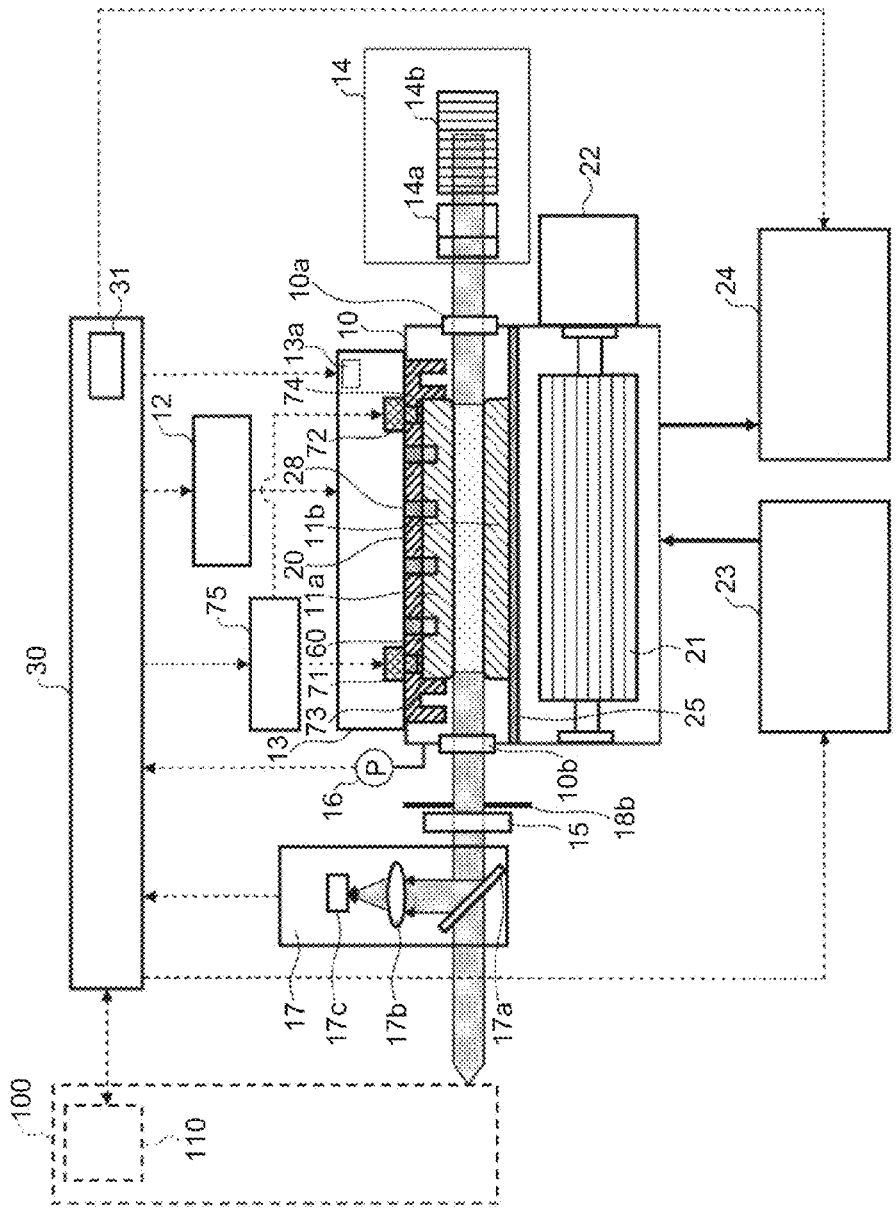
FIG. 5 is a structural diagram of a laser apparatus according to the disclosure.

Although the laser apparatus may include a connector 60, electrode moving mechanisms 71 and 72, and the like, as shown in FIG. 5, these are omitted in FIG. 1, and so forth.

1.3 Operation

The controller 30 may receive a target pulse energy Et and trigger signals being oscillation triggers from an exposure controller 110 installed in an exposure apparatus 100.

The controller 30 may set the charger 12 up as a specific charge voltage so that pulse energy of laser beams becomes the target pulse energy Et based on the received target pulse energy Et and the received trigger signals. The controller 30 may apply a voltage between the electrodes 11a and 11b by operating the switch 13a in the PPM 13 after a specific period of time is elapsed from each input of the trigger signals.

By applying the voltage, discharge may occur between the electrodes 11a and 11b, the laser gas may be excited, light emitted from the excited laser gas may resonate between the LNM 14 and the OC 15, and laser oscillation may occur. In this way, a laser beam narrowed by the prism 14a and the grating 14b may be outputted through the OC 15.

The laser beam outputted from the laser chamber 10 through the windows 10a and 10b may be deformed so that a cross-section thereof becomes a specific shape.

A laser beam having been passed through the OC 15 and partially reflected by the beam splitter 17a may enter the optical sensor 17c through the collector lens 17b. Thereby, the optical sensor 17c may measure energy of the laser beam inputted therein. Pulse energy E of the laser beam being a corresponding value may be calculated by multiplying the energy value measured by the optical sensor 17c by a specific coefficient, for instance. The specific coefficient may be an inverse of a reflectance ratio of the beam splitter 17a. In the disclosure, the operation where the pulse energy E of a laser beam being a corresponding value is calculated based on the energy value of the laser beam measured by the optical sensor 17c may be described as an operation of the optical sensor 17c measuring the pulse energy E of a laser beam. A laser beam having been passed through the beam splitter 17a may enter the exposure apparatus 100.

The storage 31 installed in the controller 30 may store the charge voltage Vhv and the pulse energy E.

The controller 30 may feedback-control the charge voltage based on a difference ΔE between the target energy Et and the corresponding value of the pulse energy E of the actually outputted laser beams.

When the charge voltage Vhv becomes greater than a maximum value of an acceptable range, the controller 30 may control the laser gas supply 23 so that the laser gas is introduced into the laser chamber 10 till a pressure in the laser chamber 10 becomes a specific pressure. When the charge voltage Vhv becomes smaller than a minimum value of the acceptable range, the controller 30 may control the laser gas exhauster 24 so that the laser gas in the laser chamber 10 is exhausted till the pressure in the laser chamber 10 becomes the specific pressure.

The laser apparatus is not limited to the line narrowing laser apparatus, and a laser apparatus outputting free-running oscillation beams can also be applied. For example, instead of the LNM 14, the high reflection mirror can be installed.

1.4 Structure of PPM and Operations of Charger and PPM

Firstly, using FIG. 2, a structure of the PPM 13 will be explained.

The PPM 13 may include a semiconductor switch being the above-described switch 13a, a transformer $TC_1$, magnetic switches $MS_1$, $MS_2$ and $MS_3$, a charge capacitor $C_0$, and capacitors $C_1$, $C_2$ and $C_3$. When a temporal integration value of voltage applied to a magnetic switch reaches a threshold thereof, a current can easily flow through the magnetic switch. In the disclosure, a state where a current can easily flow through a magnetic switch may be referred to as a state where the magnetic switch is closed. The threshold is different by each magnetic switch.

The switch 13a may be installed between the charge capacitor $C_0$ and a primary side of the transformer $TC_1$. The magnetic switch $MS_1$ may be installed between a secondary side of the transformer $TC_1$ and the capacitor $C_1$. The magnetic switch $MS_2$ may be installed between the capacitor $C_1$ and the capacitor $C_2$. The magnetic switch $MS_3$ may be installed between the capacitor $C_2$ and the capacitor $C_3$.

The primary side and the secondary side of the transformer $TC_1$ may be electrically isolated. Directions of windings at the primary side and the secondary side may be opposed to each other.

The laser chamber 10 and the electrode 11b may be connected, and both the laser chamber 10 and the electrode 11b may be grounded.

Next, operations of the charger 12 and the PPM 13 will be explained.

The controller 30 may set the charge voltage Vhv for the charger 12. The charger 12 may charge the charge capacitor $C_0$ based on the set charge voltage Vhv.

In the PPM 13, when the controller 30 transmits a signal for oscillating to the switch 13a, the switch 13a may close, and a current may flow though the primary side of the transformer $TC_1$ from the charge capacitor $C_0$.

In the transformer $TC_1$, when the current flows through the primary side of the transformer $TC_1$, on the basis of the electromagnetic induction, a current may flow through the secondary side of the transformer $TC_1$ in the reverse direction.

After that, on the basis of an electromotive force occurring with flowing the current through the secondary side of the transformer $TC_1$, the magnetic switch MS1 may close, a current may flow from the secondary side of the transformer $TC_2$ to the capacitor $C_1$, and thereby, the capacitor $C_1$ may be charged.

After that, by charging the capacitor $C_1$, the magnetic switch $MS_2$ may close, a current may flow from the capacitor $C_1$ to the capacitor $C_2$, and thereby, the capacitor $C_2$ may be charged. At this time, the capacitor $C_2$ may be charged by the current of which a pulse width is shorter than a pulse width of the current for charging the capacitor $C_1$.

After that, by charging the capacitor $C_2$, the magnetic switch $MS_3$ may close, a current may flow from the capacitor $C_2$ to the capacitor $C_3$, and thereby, the capacitor $C_3$ may be charged. At this time, the capacitor $C_3$ may be charged by the current of which a pulse width is shorter than a pulse width of the current for charging the capacitor $C_2$.

In this way, by flowing the currents from the capacitor $C_1$ to the capacitor $C_2$ and from the capacitor $C_2$ to the capacitor $C_3$, the pulse widths thereof may be shortened, and the capacitor $C_3$ may be charged.

After that, the voltage may be applied between the first electrode 11a and the second electrode 11b disposed in the laser chamber 10 from the capacitor $C_3$, and discharge may occur in the laser gas between the first electrode 11a and the second electrode 11b. At this time, to the first electrode 11a, a negative voltage (−HV) may be applied.

Input energy inputted to the electrodes 11a and 11b may be calculated from the voltage Vhv applied to the charge capacitor $C_0$ and the capacity $C_{0C}$ of the charge capacitor $C_0$. That is, the input energy Ein for the electrodes may be represented by the following formula (1). Here, k is a coefficient indicating an attenuation value of charge in an electric circuit shown in FIG. 2.

$$Ein = k \times C_{0C} \times (Vhv)^2/2 \qquad (1)$$

1.5 Structure and Operation of Laser Chamber

Using FIGS. 3A and 3B, a structure of the laser chamber will be explained in detail.

The laser chamber 10 may include an electrode holder 25 on which the second electrode 11b is arranged, a heat exchanger 26, metal wirings 27, and the like.

In the laser chamber 10, current introduction terminals 28 each of which penetrates the insulator 20. As described above, the first electrode 11a is arranged on the insulator 20, and the first electrode 11a and the PPM 13 may be connected to each other by the current introduction terminals 28. Thereby, the PPM 13 may apply the negative voltage being −HV to the first electrode 11a. The insulator 20 may be formed of insulating material such as ceramics, and for instance, it may be formed of alumina.

The second electrode 11b may be arranged on the electrode holder 25 so as to face the first electrode 11a. The first electrode 11a and the second electrode 11b may be formed of metal material including copper (Cu).

The electrode holder 25 may be formed of metal material including Al or Cu. The electrode holder 25 may be grounded through the conductive metal wirings 27 formed of metal material, or the like, together with metal parts of a housing of the laser chamber 10 and grounding terminals of the PPM 13.

The metal wirings 27 may be arranged at regular intervals along a longitudinal direction of the second electrode 11b.

Next, an operation of the laser chamber will be explained in detail.

By driving the cross flow fan 21 in the laser chamber 10, the laser gas in the laser chamber 10 may be circulated in a direction indicated by arrows.

In the laser chamber 10, the laser gas may flow between the metal wirings 27, and furthermore, flow between the first electrode 11a and the second electrode 11b.

Although discharge occurring between the first electrode 11a and the second electrode 11b generates discharge products, the discharge products may flow toward the direction indicated by the arrows by the circulating laser gas. The circulating laser gas may be cooled by passing through a space where the heat exchanger 26 is disposed. The cross flow fan 21 may further circulate the cooled laser gas.

When a discharge cycle at the first electrode 11a and the second electrode 11b is short, i.e., when a frequency of voltages applied between the first electrode 11a and the second electrode 11b is high, a flow rate of the circulating laser gas should be increased in order to discharge stably. This is because discharge may become unstable when discharge products generated by discharge exist around the first electrode 11a and the second electrode 11b.

1.6 Abrasion of Pair of Electrodes

Figure 3A:
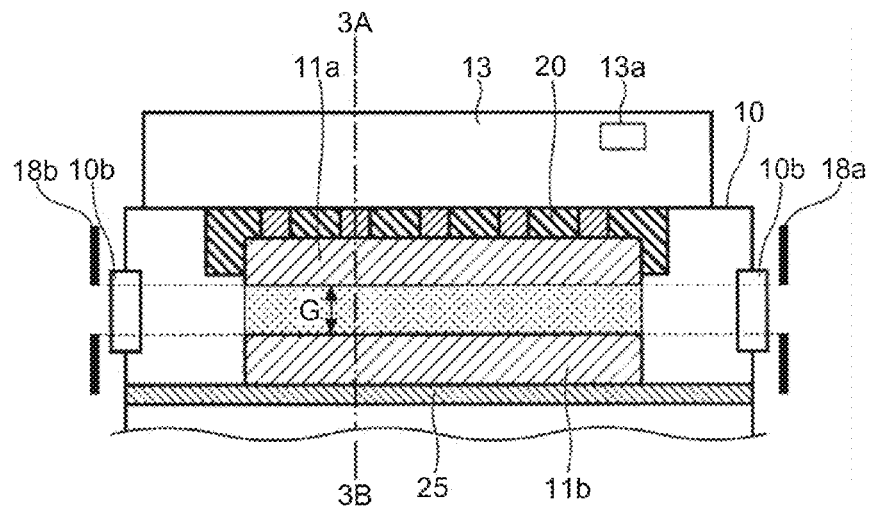
FIGS. 3A and 3B are first illustrations for explaining an abrasion of an electrode due to discharging.
Figure 3B:
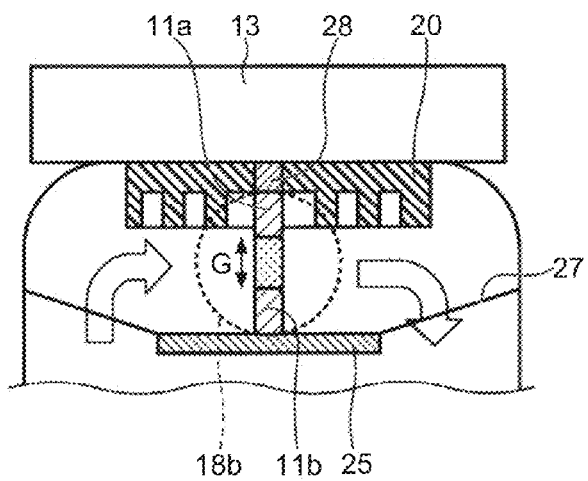

As shown in FIGS. 3A and 3B, when the first electrode 11a and the second electrode 11b are new, a gap (interelectrode gap G) between the first electrode 11a and the second electrode 11b may be the same as a width of each of apertures of the slits 18a and 18b in a vertical direction in FIGS. 3A and 3B. Here, FIG. 3A is a cross section view of major portions of the laser chamber 10 in the same plane as in FIG. 1, and FIG. 3B is a cross section view of major portions of the laser chamber 10 in a plane 3A-3B in FIG. 3A.

Figure 4A:
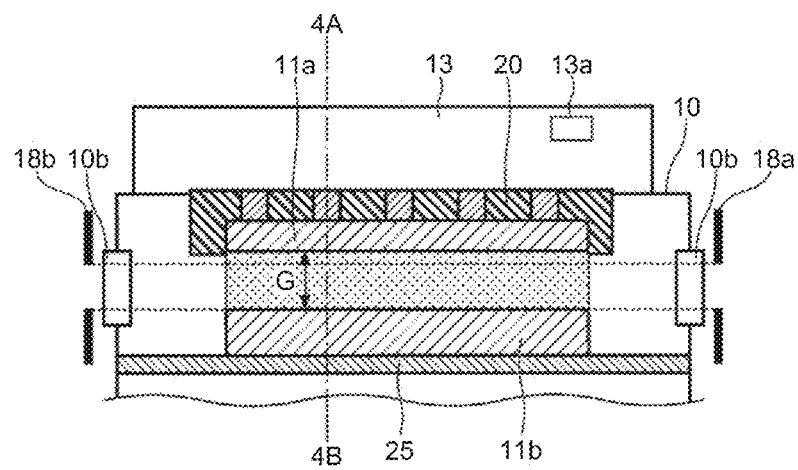
FIGS. 4A and 4B are second illustrations for explaining the abrasion of the electrode due to discharging.
Figure 4B:
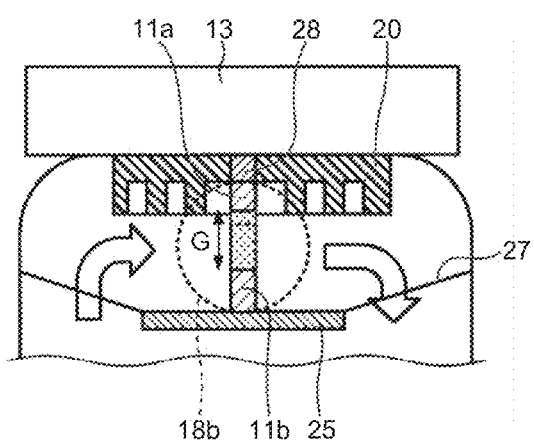

However, when discharges are repeated by applying voltages between the first electrode 11a and the second electrode 11b, surfaces of the first electrode 11a and/or the second electrode 11b will be abraded, and thereby, as shown in FIGS. 4A and 4B, the gap between the first electrode 11a and the second electrode 11b will be expanded. That is, the interelectrode gap G will be increased. In such case, the interelectrode gap G may be increased greater than the width of each of the apertures of the slits 18a and 18b, and thereby, pulse energy of each outputted laser beam will become small. Here, FIG. 4A is a cross section view of major portions of the laser chamber 10 in the same plane as in FIG. 1, and FIG. 4B is a cross section view of major portions of the laser chamber 10 in a plane 4A-4B in FIG. 4A.

When the interelectrode gap G is expanded by abrading the first electrode 11a and/or the second electrode 11b due to discharges, the flow rate of the laser gas flowing between the first electrode 11a and the second electrode 11b may be reduced, and discharge may easily become unstable. As a result, the stability of pulse energy of outputted laser beams may be degraded.

In FIGS. 4A and 4B, although the first electrode 11a is abraded by discharging, the second electrode 11b may also be abraded by discharging.

2. Laser Apparatus with Mechanism for Moving Electrode in Discharge Direction

The laser apparatus according to the disclosure may include the connector 60, the electrode moving mechanisms 71 and 72, and the like, as shown in FIG. 5. The connector 60 may be electrically connected to the first electrode 11a. The electrode moving mechanisms 71a and 71b may be connected to the first electrode 11a via insulators 73 and 74. The electrode moving mechanisms 71 and 72 may be driven by a driver 75 based on control from the controller 30. Thereby, the controller 30 may move the first electrode 11a at a specific timing.

Figure 6A:
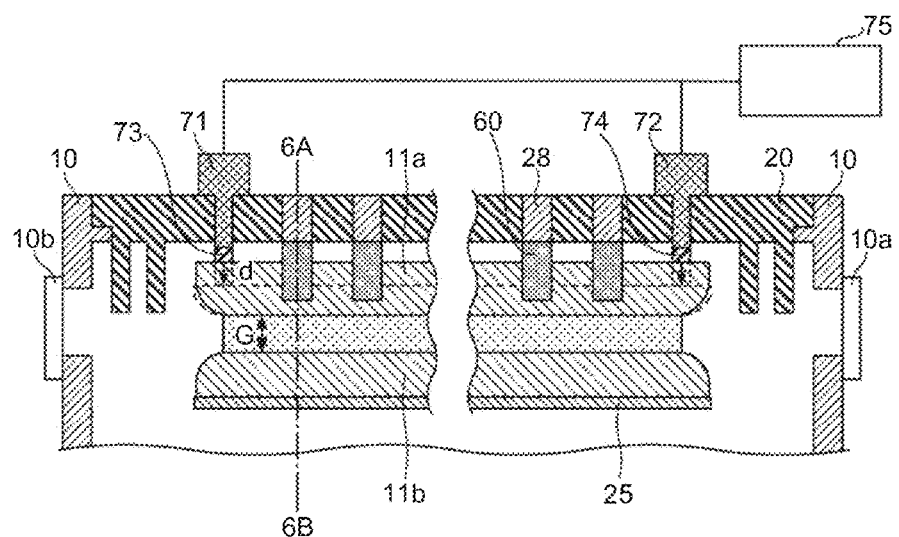
FIGS. 6A and 6B are illustrations of a laser chamber in the laser apparatus according to the disclosure.
Figure 6B:
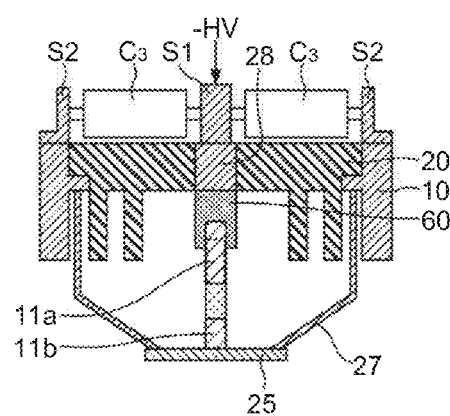

3. Laser Chamber with Mechanism for Moving Electrode in Discharge Direction 3.1 Structure Using FIGS. 6A and 6B, the laser chamber 10 in the laser apparatus according to the disclosure will be explained. FIGS. 6A and 6B are cross section views showing major portions of the laser chamber 10. FIG. 6A is a cross section view of the laser chamber 10 in the same plane as in FIG. 1, and FIG. 6B is a cross section view in a plane 6A-6B in FIG. 6A. In FIG. 6B, a case where two capacitors $C_3$ in the PPM 13 are installed is shown as an example. One terminal of each of the capacitors $C_3$ may be connected to a link electrode S1 connected to a current introduction terminal 28, and the other terminal may be connected to grounded link electrodes S2.

In the laser apparatus according to the disclosure, the connector 60 may be mounted at a tip of the current introduction terminal 28, and the current introduction terminal 28 and the first electrode 11a are connected to each other via the connector 60. The connector 60 may support the first electrode 11a while allowing the first electrode 11a move toward a side where the second electrode 11b is disposed. The connector 60 may be structured so that the electrical connection between the current introduction terminal 28 and the first electrode 11a will be maintained even when the first electrode 11a moves within a specific range toward the side where the second electrode 11b is disposed.

In the insulator 20, the electrode moving mechanisms 71 and 72 may be installed. Between the electrode moving mechanism 71 and the first electrode 11a, the insulator 73 may be disposed, and between the electrode moving mechanism 72 and the first electrode 11a, the insulator 74 may be disposed. The electrode moving mechanism 71 may be disposed near one edge of the first electrode 11a in the longitudinal direction, and the electrode moving mechanism 72 may be disposed near the other edge of the first electrode 11a in the longitudinal direction.

The electrode moving mechanism 71 and the electrode moving mechanism 72 may move the first electrode 11a via the insulators 73 and 74 toward the side where the second electrode 11b is disposed. Thereby, the gap between the first electrode 11a and the second electrode 11b, i.e., a length of the interelectrode gap G, may be adjusted.

When a part or all of the electrode moving mechanisms 71 and 72 are formed by insulators, there may be a case that the insulators 73 and 74 are omitted.

3.2 Operation

Because the surface of the first electrode 11a facing the second electrode 11b is abraded by repeating discharges between the first electrode 11a and the second electrode 11b, for instance, the gap between the first electrode 11a and the second electrode 11b expands.

In this way, when the gap between the first electrode 11a and the second electrode 11b expands greater than a specific length, the first electrode 11a is moved toward the side where the second electrode 11b is disposed by a travel distance d by driving the electrode moving mechanisms 71 and 72 using the driver 75. The travel distance d may be approximately the same as a length of abrasion of the first electrode 11a. By moving the abraded first electrode 11a, the gap between the first electrode 11a and the second electrode 11b may be set as the specific gap. For example, the gap between the first electrode 11a and the second electrode 11b may be set as approximately the same gap with an initial gap.

3.3 Effect

In the laser apparatus according to the disclosure, the first electrode 11a may be biased by the electrode moving mechanisms 71 and 72 via the insulators 73 and 74. Therefore, the electrode moving mechanism 71 may be insulated from the first electrode 11a using the insulator 73, and the electrode moving mechanism 72 may be insulated from the first electrode 11a using the insulator 74. Because the electrical connection between the current introduction terminal 28 and the first electrode 11a is maintained by the connector 60 even when the first electrode 11a is moved toward the side where the second electrode 11b is disposed within the specific range, it is possible to discharge between the first electrode 11a and the second electrode 11b.

4. Explanation of Connector of Electrode in Excimer Laser Apparatus

Next, a structure of the connector 60 of an electrode used for the laser apparatus according to the disclosure will be explained.

4.1 First Embodiment of Connector

Figure 7:
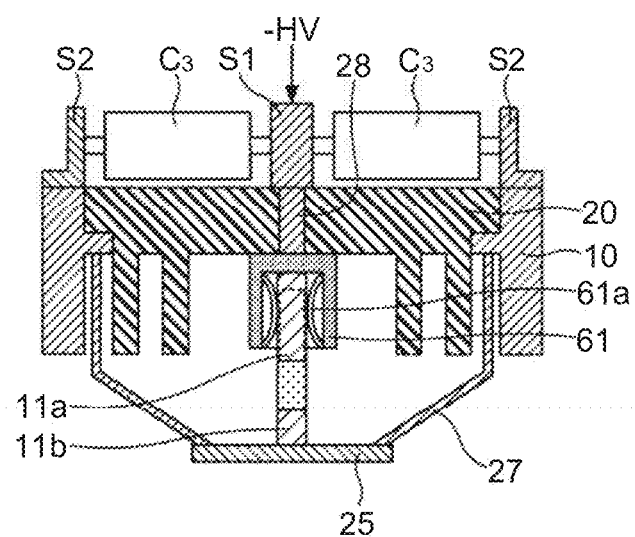
FIG. 7 is a first illustration of a connector according to a first embodiment.
Figure 8A:
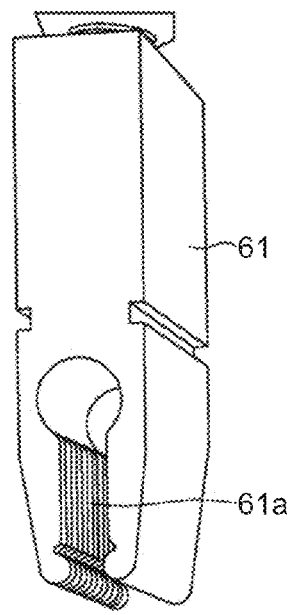
FIGS. 8A and 8B are second illustrations of the connector according to the first embodiment.
Figure 8B:
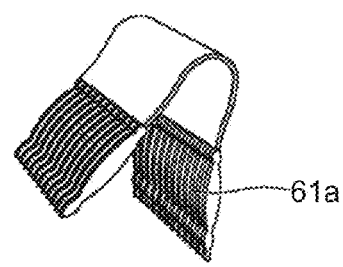

A connector contacting with the first electrode 11a may be a fork connector 61 as shown in FIGS. 7, 8A and 8B. The term "fork" indicates a branching structure, for instance. The fork connector 61 may include leaf springs 61a of which a shape of portions contacting with the first electrode 11a is furcate. Into the fork connector 61 shown in FIG. 8A, a member with the leaf springs 61a being elastic members shown in FIG. 8B may be loaded. The leaf springs 61a may be made of elastic metal. The connectors 60 in FIG. 6, and so forth, may be the fork connector 61 according to the disclosure. FIG. 7 shows a structural example of the laser chamber 10 with the fork connector 61, FIG. 8A is a perspective view showing the fork connector 61, and FIG. 8B is a perspective view showing the leaf springs 61a in the fork connector 61.

In the fork connector 61, even when the first electrode 11a expands due to rising a temperature thereof, because the first electrode 11a extends in the longitudinal direction so that the first electrode 11a glides over a contact portion with the leaf springs 61a, it is possible to prevent the first electrode 11a from bending due to stress caused by thermal expansion. Furthermore, because the first electrode 11a extends so that the first electrode 11a glides over the contact portion with the leaf springs 61a, it is possible to prevent the insulators 73 and 74 from destruction due to stresses between the first electrode 11a and the electrode moving mechanisms 71 and 72 caused by the thermal expansion.

The leaf springs 61a forming the fork connector 61 may be made of alloy of beryllium (Be) and copper (Cu), brass, or the like. Surfaces of the leaf springs 61a may be nickelized. Because the laser gas in the laser chamber 10 includes fluorine ($F_2$) gas, by forming the nickel plate with corrosion resistance to fluorine gas on the surfaces of the leaf springs 61a, corrosion resistance to fluorine gas of the leaf springs 61a may be increased.

4.2 Second Embodiment of Connector

Figure 9:
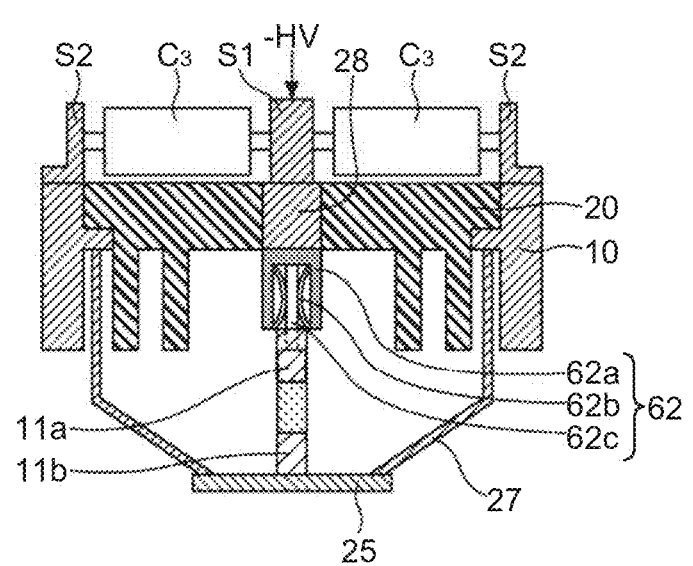
FIG. 9 is a first illustration of a connector according to a second embodiment.
Figure 10:
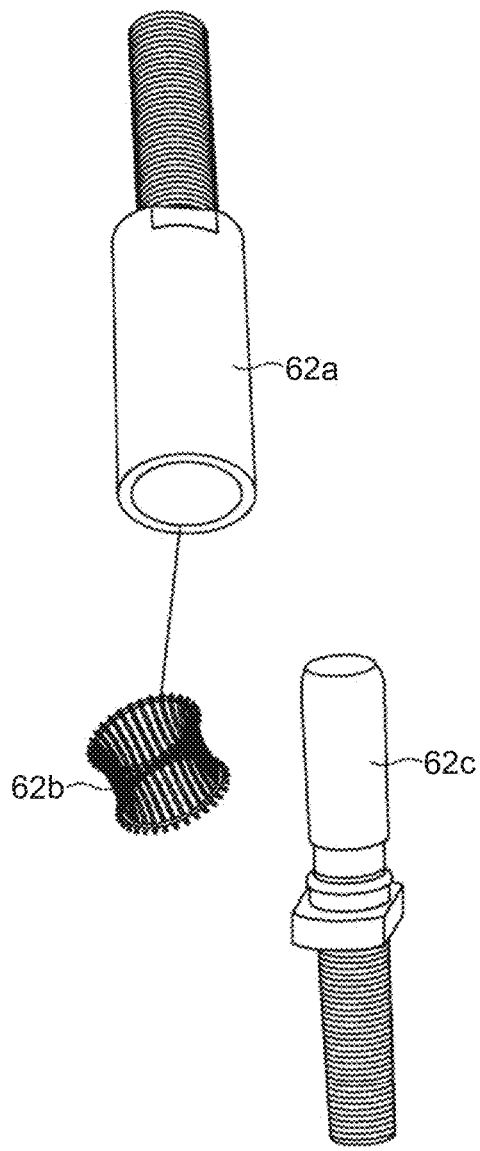
FIG. 10 is a second illustration of the connector according to the second embodiment.

The connector contacting with the first electrode 11a may be a connector 62 with a structure including a socket 62a, elastic members 62b and a plug 62c. In the connector 62, the socket 62a may be electrically connected to the current introduction terminal 28, and the plug 62c may be electrically connected to the first electrode 11a. The plug 62c may be inserted into the socket 62a so as to be sandwiched by the elastic members 62b, and the plug 62c may be electrically connected to the socket 62a via the elastic members 62b. The connectors 60 in FIG. 6, and so forth, may be the connector 62 according to the disclosure. FIG. 9 shows a structural example of the laser chamber 10 with the connector 62, and FIG. 10 is a perspective view showing the structure of the connector 62.

Figure 11:
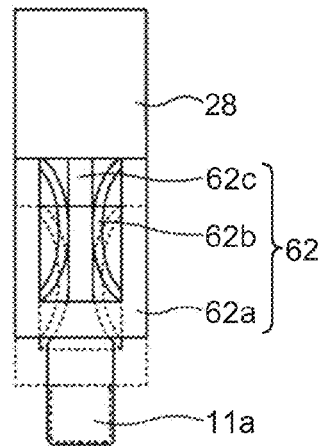
FIG. 11 is a third illustration of the connector according to the second embodiment.

As shown in FIG. 11, the plug 62c may be electrically connected to the current introduction terminal 28 using the connector 62, and the socket 62a may be electrically connected to the first electrode 11a.

4.3 Third Embodiment of Connector

Figure 12A:
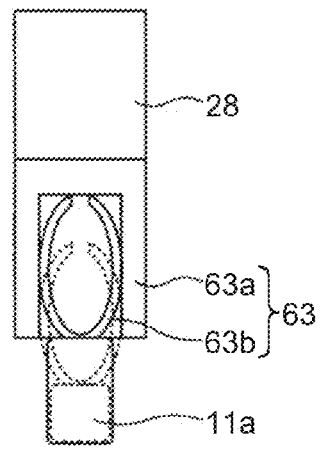
FIGS. 12A and 12B are illustrations of a connector according to a third embodiment.
Figure 12B:
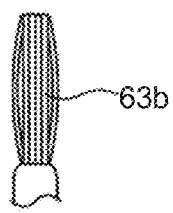

As shown in FIGS. 12A and 12B, the connector contacting with the first electrode 11a may be a connector 63 with a structure including a socket 63a and a plug 63b. The plug 63b may have an elastic plug. The connector 63 may be electrically connected by contacting between an internal surface of the socket 63a and the plug 63b. In the connector 63, for example, the socket 63a may be electrically connected to the current introduction terminal 28, and the plug 63b may be electrically connected to the first electrode 11a. The connectors 60 in FIG. 6, and so forth, may be the connector 63 according to the disclosure. FIG. 12A shows the structure of the connector 63, and FIG. 12B shows the plug 63b.

5. Explanation of Electrode Moving Mechanism in Excimer Laser Apparatus

Next, structures of the electrode moving mechanisms 71 and 72 for the electrodes used for the laser apparatus according to the disclosure will be explained. Electrode moving mechanisms 18, 82 and 83 which will be described later on can be used as the electrode moving mechanisms 71 and 72, respectively. The insulator 73 in the following may be the insulator 74.

5.1 First Embodiment of Electrode Moving Mechanism

Figure 13:
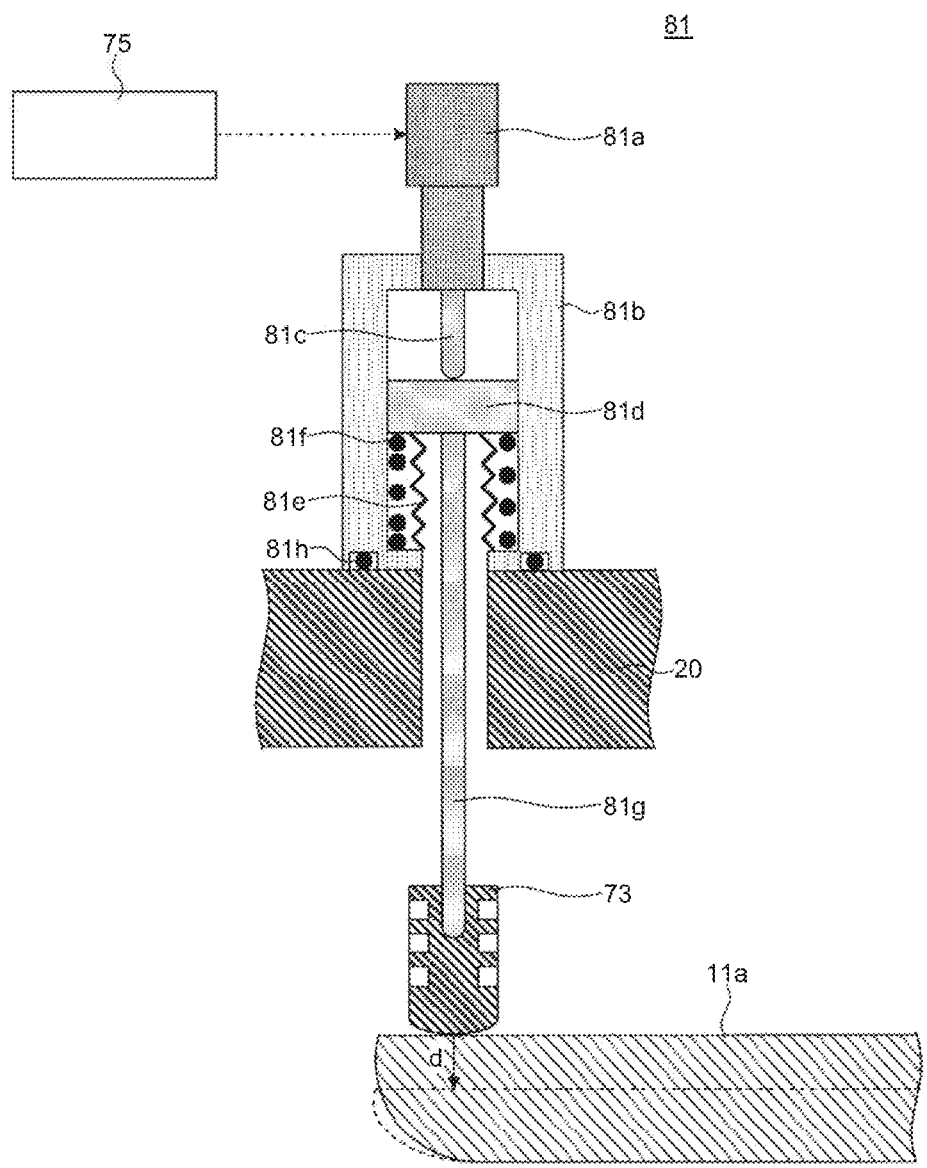
FIG. 13 is an illustration of an electrode moving mechanism according to the first embodiment.

As shown in FIG. 13, the electrode moving mechanism for moving the first electrode 11a may be an electrode moving mechanism 81 with a micrometer head 81a. Specifically, the electrode moving mechanism 81 may include the micrometer head 81a, a cylinder 81b, a spindle 81c, a piston 81d, a bellows 81e, a spring 81f, a shaft 81g, and so forth. The cylinder 81b may be connected to the insulator 20 via an O ring 81h. In the cylinder 81b, the piston 81d may be disposed, and at a side of the piston 81d facing the insulator 20, the bellows 81e and the spring 81f may be disposed. The side of the piston 81d facing the insulator 20 may be joined to one end of the shaft 81g, and the other end of the shaft 81g may be joined to the insulator 73.

The micrometer head 81a may be driven by the driver 75 based on control from the controller 30. By driving the micrometer head 81a, the piston 81d in the cylinder 81b may be biased via the spindle 81c. Thereby, the piston 81d may bias the first electrode 11a via the shaft 81g and the insulator 73. The bellows 81e may be disposed at the side joined to the shaft 81g in the piston 81d, and isolate the inside of the laser chamber 10 from the external.

Accordingly, in the electrode moving mechanism 81, the laser gas in the laser chamber 10 can be prevented from leaking by the bellows 81e, and the micrometer head 81a can move the first electrode 11a toward the second electrode 11b via the shaft 81g, and so forth.

When the first electrode 11a is moved manually, a manual micrometer head can be used as the micrometer head 81a. In such case, the driver 75 can be omitted.

5.2 Second Embodiment of Electrode Moving Mechanism

Figure 14:
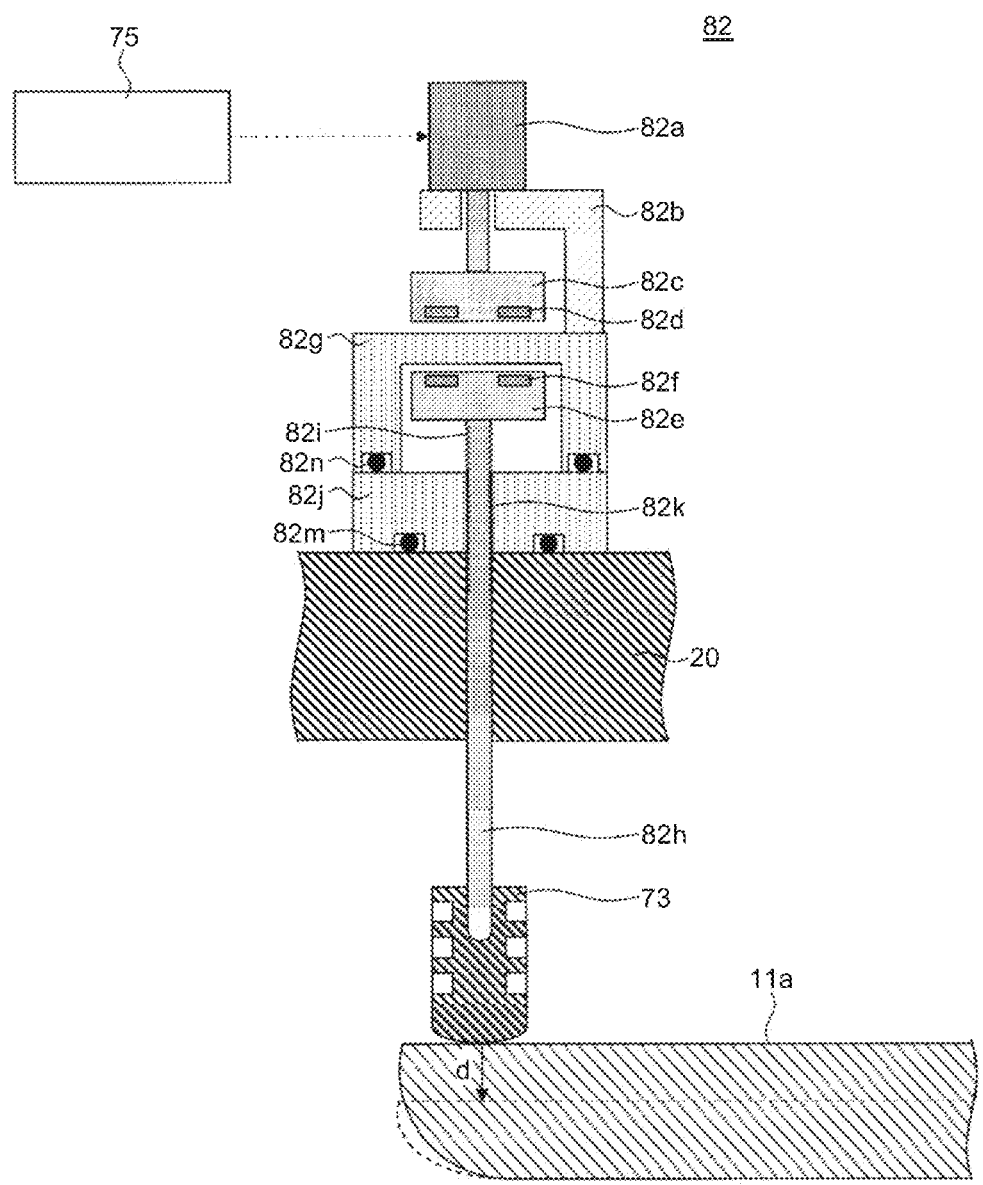
FIG. 14 is an illustration of an electrode moving mechanism according to the second embodiment.

As shown in FIG. 14, the electrode moving mechanism for moving the first electrode 11a may be an electrode moving mechanism using magnetic coupling. Specifically, an electrode moving mechanism 82 may include a pulse motor 82a, a bracket 82b, a first disk 82c, a second disk 82e, a closed vessel 82g, a shaft 82h, a plate 82j, and so forth. The plate 82j may be joined to the insulator 20 via an O ring 82m. A groove 82i may be formed at the shaft 82h, and a shave 82k corresponding to the groove 82i may be formed at the plate 82j. The closed vessel 82g may be joined to the plate 82j via an O ring 82n. The second disk 82e may be disposed in the closed vessel 82g, and the second disk 82e may be joined to one end of the shaft 82h. The other end of the shaft 82h may be joined to the insulator 73. The first disk 82c may be located outside the closed vessel 82g, and the first disk 82c may be joined to the pulse motor 82a. The closed vessel 82g may have the bracket 82b for mounting the pulse motor 82a. The first disk 82c may have a permanent magnet 82d, and the second disk 82e may have a permanent magnet 82f. The first disk 82c and the second disk 82e may be disposed so that a surface with the permanent magnet 82d of the first disk 82c faces a surface with the permanent magnet 82f of the second disk 82e while sandwiching a wall of the closed vessel 82g therebetween.

The pulse motor 82a may be driven by the driver 75 based on control from the controller 30. When the pulse motor 82a rotates, the first disk 82c may rotate, and thereby, the second disk 82e with the permanent magnet 82f being magnetically coupled to the permanent magnet 82d of the first disk 82c may rotate. When the second disk 82e rotates, the shaft 82h may rotate, and thereby, the shaft 82h may move downward along the groove 82i formed at the shaft 82h. When the shaft 82h moves downward, the first electrode 11a may be biased via the insulator 73 toward the side where the second electrode 11b is disposed. The closed vessel 82g and the O ring 82n may isolate the inside of the laser chamber 10 from the external.

5.3 Third Embodiment of Electrode Moving Mechanism

Figure 15:
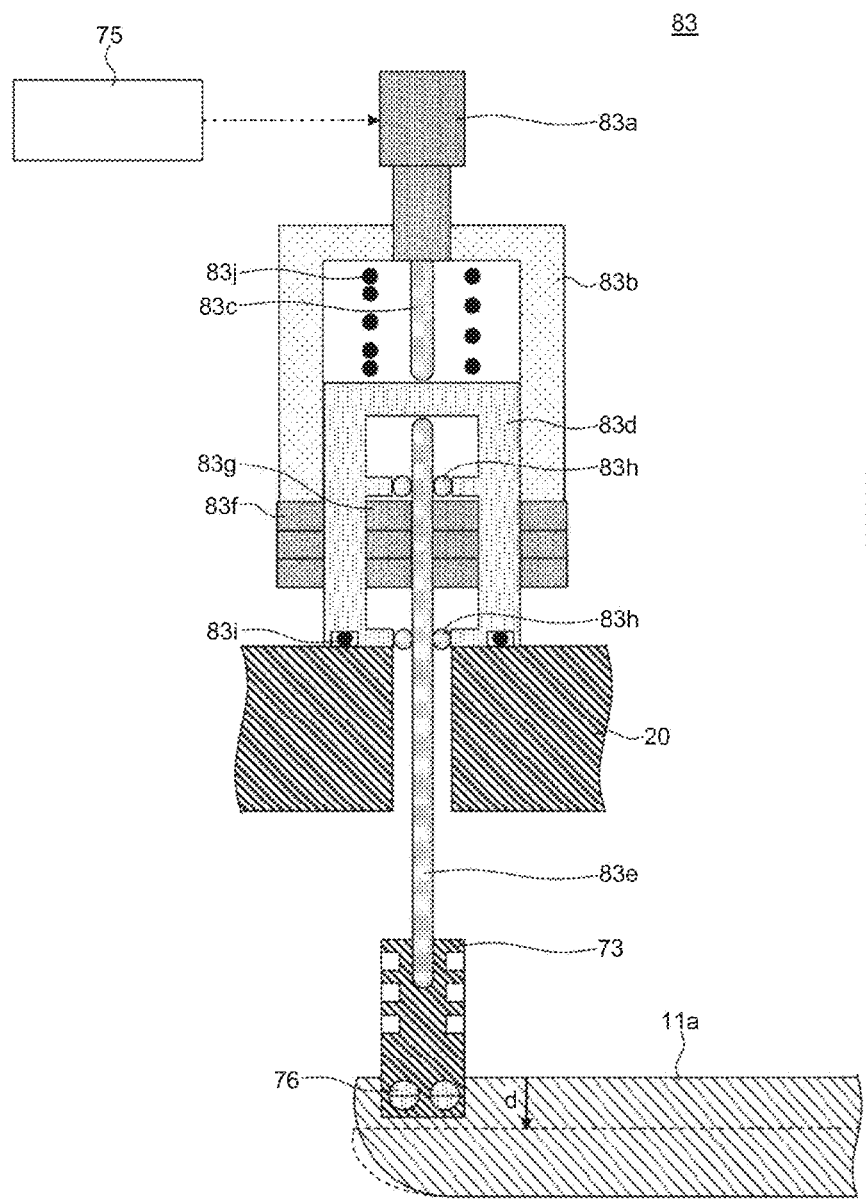
FIG. 15 is an illustration of an electrode moving mechanism according to the third embodiment.

As shown in FIG. 15, the electrode moving mechanism for moving the first electrode 11a may be an electrode moving mechanism 83 using another magnetic coupling. Specifically, the electrode moving mechanism 83 may include a micrometer head 83a, an outer cylinder 83b, a spindle 83c, an inner cylinder 83d, a shaft 83e, permanent magnets 83f and 83g, and so forth. The inner cylinder 83d may be joined to the insulator 20 of the laser chamber 10 via an O ring 83i. Into the inner cylinder 83d, one end of the shaft 83e may be inserted, and to a side of the shaft 83e, the permanent magnet 83g may be attached. The shaft 83e may be arranged to the inner cylinder 83d via bearings 83h so as to be slidable along the inner cylinder 83d.

Outside of the inner cylinder 83d, the outer cylinder 83b may be arranged so as to cover the inner cylinder 83d, and to the outer cylinder 83b, the permanent magnet 83f may be arranged. The permanent magnets 83g and 83f may be coupled to each other via a side wall of the inner cylinder 83d. In the disclosure, one of facing portions of the permanent magnets 83f and 83g may be a north pole, and the other may be a south pole. One of the permanent magnets 83f and 83g may be replaced with a member made of a material including electromagnetic material such as ferrum (Fe), nickel (Ni), cobalt (Co), for instance. To the outer cylinder 83b, the micrometer head 83a may be arranged, and the spindle 83c joined to the micrometer head 83a may contact with the inner cylinder 83d. Between the outer cylinder 83b and the inner cylinder 83d in the outer cylinder 83b, a spring 83j may be arranged.

The micrometer head 83a may be driven by the driver based on control from the controller 30. By driving the micrometer head 83a, the outer cylinder 83b may move downward with respect to the cylinder 83d. When the outer cylinder 83b moves downward, the permanent magnet 83f arranged to the outer cylinder 83b may also move downward, and thereby, the permanent magnet 83g being magnetically coupled with the permanent magnet 83f may move downward. By moving the permanent magnet 83g downward, the shaft 83e to which the permanent magnet 83g is joined may move downward in the cylinder 83d, and thereby, the first electrode 11a may be biased via the insulator 73 toward the side where the second electrode 11b is disposed. The insulator 73 may be joined to the first electrode 11a using clinchers 76. By fixing the insulator 73 to the first electrode 11a using the clinchers 76, the first electrode 11a may be moved upward and downward. The inner cylinder 83d and the O ring 83i may isolate the inside of the laser chamber 10 from the external.

5.4 Fourth Embodiment of Electrode Moving Mechanism

Figure 16:
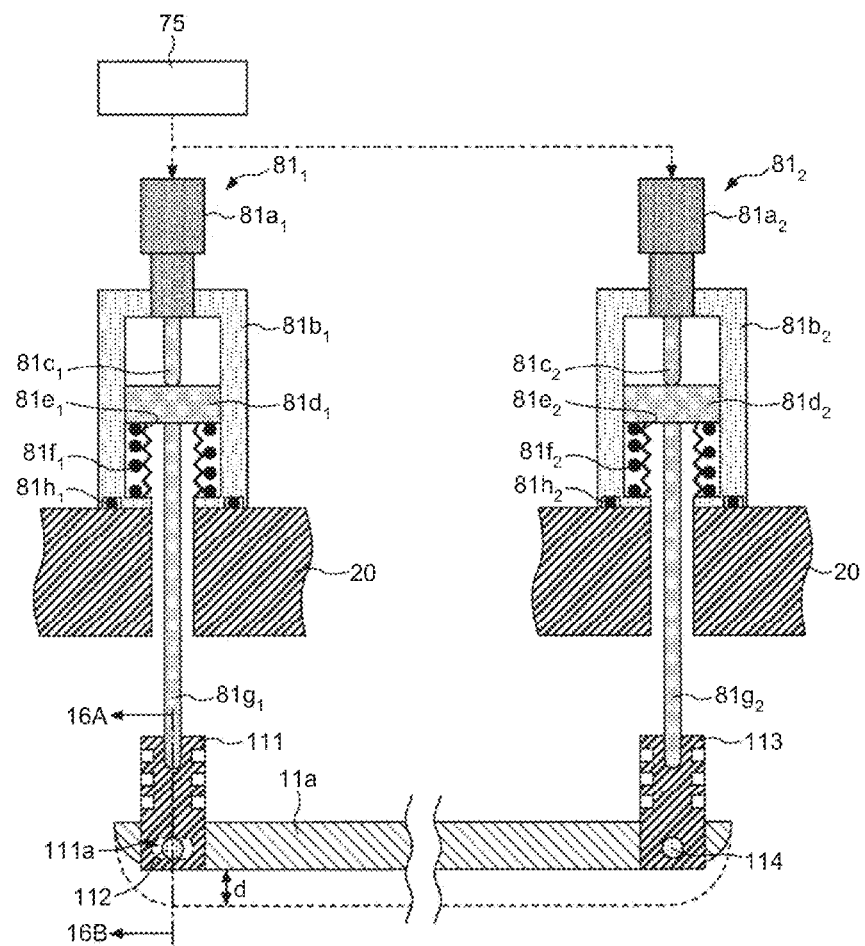
FIG. 16 is a first illustration of an electrode moving mechanism according to the fourth embodiment.

In order to move the first electrode 11a, two electrode moving mechanisms 81 shown in FIG. 13 may be used, and the two electrode moving mechanisms 81 may be driven independently. Specifically, as shown in FIG. 16, one electrode moving mechanism $81_1$ may include a micrometer head $81a_1$, a cylinder $81b_1$, a spindle $81c_1$, a piston $81d_1$, a bellows $81e_1$, a spring $81f_1$, a shaft $81g_1$, and so forth. The cylinder $81b_1$ may be connected to the insulator 20 via an O ring $81h_1$. The other electrode moving mechanism $81_2$ may include a micrometer head $81a_2$, a cylinder $81b_2$, a spindle $81c_2$, a piston $81d_2$, a bellows $81e_2$, a spring $81f_2$, a shaft $81g_2$, and so forth. The cylinder $81b_2$ may be connected to the insulator 20 via an O ring $81h_2$.

Figure 17:
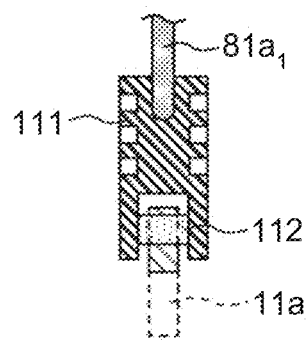
FIG. 17 is a second illustration of the electrode moving mechanism according to the fourth embodiment.

To an end of the shaft $81g_1$ of the electrode moving mechanism $81_1$, an insulator 111 may be joined, and to an end of the shaft $81g_2$ of the electrode moving mechanism $81_2$, an insulator 113 may be joined. FIG. 17 is a cross section view in a plane 16A-16B in FIG. 16.

Specifically, to one end of the first electrode 11a, the insulator 111 arranged to the end of the shaft $81g_1$ of the electrode moving mechanism $81_1$ may be joined using an electrode fixing pin 112. To the other end of the first electrode 11a, the insulator 113 arranged to the end of the shaft $81g_2$ of the electrode moving mechanism $81_2$ may be joined using an electrode fixing pin 114.

At the insulator 111, a landscape-oriented aperture 111a may be formed so that the electrode fixing pin 112 can move in a longitudinal direction of the electrode 11a. The first electrode 11a may be linked with the insulator 111 using the electrode fixing pin 112 which is projected from the first electrode 11a and engaged with the aperture 111a, and the electrode fixing pin 112 may be slidable in the aperture 111a. The insulator 113 may be linked with the first electrode 11a using the electrode fixing pin 114 so that the first electrode 11a can rotate.

When the first electrode 11a is abraded, the first electrode 11a is moved using the two electrode moving mechanisms $81_1$ and $81_2$ toward the side where the second electrode 11b is disposed. At this time, there is a case where it is impossible to let the first electrode 11a move so that both ends of the first electrode 11a move at the same speed. Furthermore, there is a case where one end of the first electrode 11a is moved close to the side where the second electrode 11b is disposed, and then, the other end is moved close to the side where the second electrode 11b is disposed. In such cases, when the both ends of the first electrode 11a are fixed to the respective insulators, the first electrode 11a is stressed by moving the first electrode 11a close to the side where the second electrode 11b is disposed, and thereby, the first electrode 11a and the shafts $81g_1$ and $81g_2$ may be deformed. On the other hand, by arranging the landscape-oriented aperture 111a capable of letting the electrode fixing pin 112 move to the insulator 111 joined to the end of the first electrode 11a, it is possible to prevent the first electrode 11a or the shafts $81g_1$ and $81g_2$ from being deformed. That is, because the electrode fixing pin 112 joined to the first electrode 11a can move in the aperture 111a, it is possible to prevent the first electrode 11a or the shafts $81g_1$ and $81g_2$ from being deformed.

Figure 18:
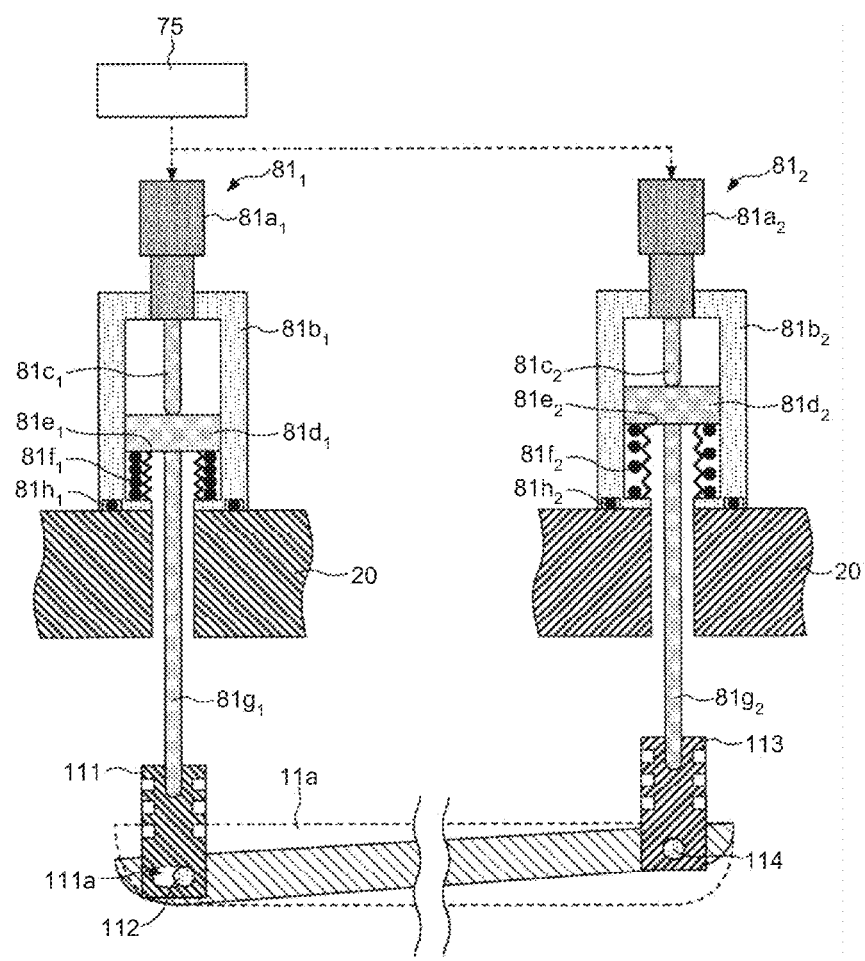
FIG. 18 is a third illustration of the electrode moving mechanism according to the fourth embodiment.

Specifically, firstly, by driving the micrometer head $81a_1$ of the electrode moving mechanism $81_1$ from the state shown in FIG. 16, the piston $81d_1$ in the cylinder $81d_1$ may be biased via the spindle $81c_1$. Thereby, the spindle $81d_1$ may bias the insulator 111 via the shaft $81g_1$, and thereby, one end of the first electrode 11a joined to the insulator 111 via the electrode fixing pin 112 may be biased. FIG. 18 shows such state. As shown in FIG. 18, in such state, because the electrode fixing pin 112 moves in the landscape-oriented aperture 111a formed at the insulator 111, it is possible to suppress the first electrode 11a from being stressed. Thereby, it is possible to suppress deformations of the first electrode 11a, the shafts $81g_1$ and $81g_2$.

Figure 19:
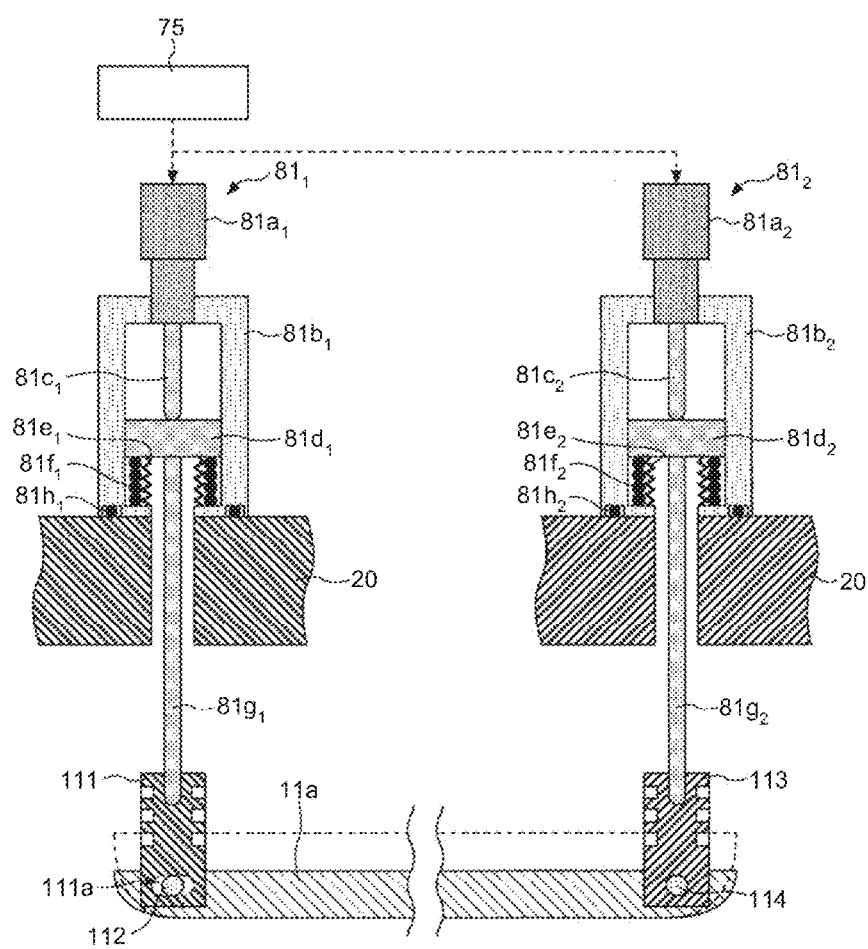
FIG. 19 is a fourth illustration of the electrode moving mechanism according to the fourth embodiment.

Then, by driving the micrometer head $81a_2$ of the electrode moving mechanism $81_2$, the piston $81d_2$ in the cylinder $81b_2$ may be biased via the spindle $81c_2$. Thereby, the piston $81d_2$ may bias the insulator 113 via the shaft $81g_2$, and thereby, the other end of the first electrode 11a joined to the insulator 113 via the electrode fixing pin 114 may be biased. FIG. 19 shows such state. As a result, the first electrode 11a can be closed to the second electrode 11b so that the gap between the first electrode 11a and the second electrode 11b becomes even. Here, as shown in FIG. 19, in such state, because the electrode fixing pin 112 moves in the landscape-oriented aperture 111a formed at the insulator 111, it is possible to suppress the first electrode 11a from being stressed. Thereby, it is possible to suppress deformations of the first electrode 11a, the shafts $81g_1$ and $81g_2$.

5.5 Fifth Embodiment of Electrode Moving Mechanism

Figure 20:
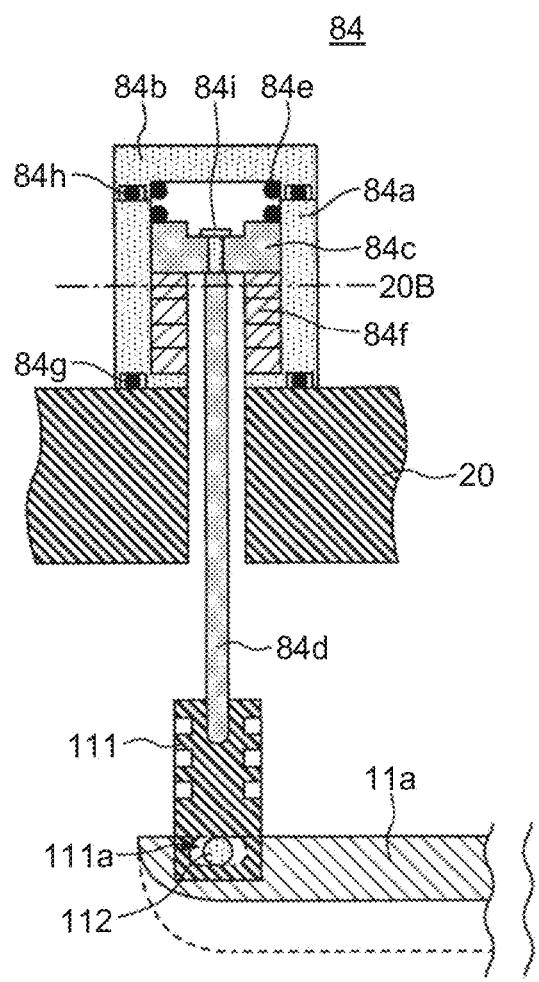
FIG. 20 is a first illustration of an electrode moving mechanism according to a fifth embodiment.

As shown in FIG. 20, the electrode moving mechanism for moving the first electrode 11a may be an electrode moving mechanism 84 using shims. Specifically, the electrode moving mechanism 84 may include a cover cylinder 84a, a cover cap 84b, a piston 84c, a shaft 84d, a spring 84e, a plurality of shims 84f, and so forth.

The cover cylinder 84a may be joined to the insulator 20 via an O ring 84g. The cover cap 84b may be joined to the cover cylinder 84a via an O ring 84h. In a space separated by the cover cylinder 84a and the cover cap 84b, the spring 84e, the piston 84c, the plurality of shims 84f, and so forth, may be disposed.

Figure 21A:
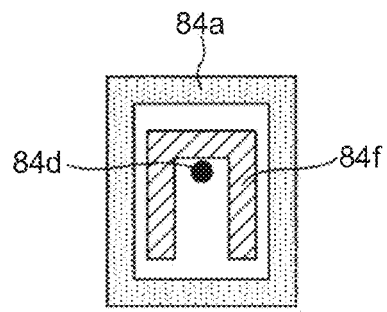
FIGS. 21A and 21B are second illustrations of the electrode moving mechanism according to the fifth embodiment.
Figure 21B:
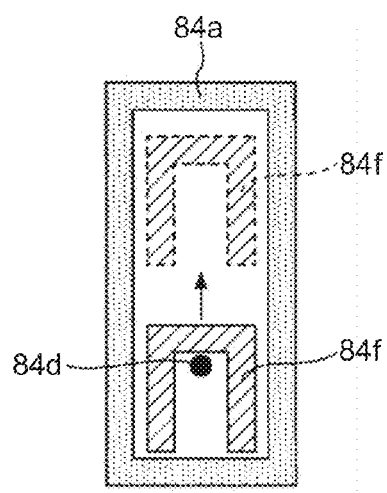

The plurality of shims 84f may be stacked, and the piston 84c may be disposed on the plurality of shims 84f. Each shim 84f may have a horseshoe shape, and an aperture may be formed thereat. The stacked shims 84f may be arranged so that the shaft 84d is engaged in the apertures of the shims 84f. FIG. 21A is a cross section view in a plane 20A-20B in FIG. 20. FIG. 21B is a cross section view in a plane 20A-20B in another example of FIG. 20.

The piston 84c may be biased toward the insulator 20 by resilience of the spring 84e. One end of the shaft 84d may be joined to the piston 84c using a bolt 84i, and the other end of the shaft 84d may be joined to the insulator 111.

When the first electrode 11a is abraded, by removing a part of the shims 84f, the first electrode 11a can be closed to the side where the second electrode 11b is disposed. Specifically, the laser chamber 10 may be purged by noble gas more than once, and the laser chamber 10 may be filled with noble gas till approximately atmospheric pressure. After that, the cover cap 84b may be removed from the cover cylinder 84a, and the spring 84e may be removed. After that, by removing the bolt 84i, the piston 84c may be removed from the shaft 84c, and one or more shims 84f corresponding to a wear volume of the first electrode 11a may be removed. Thereby, the gap between the first electrode 11a and the second electrode 11b may become a desired gap. After that, the piston 84 may be joined to the shaft 84d using the bolt 84i, the spring 84i may be mounted on the original position, and then, the cover cap 84b may be joined to the cover cylinder 84a. After that, leakage from the laser chamber 10 may be checked, and the noble gas in the laser chamber 10 may be replaced with the laser gas with a specific pressure.

As a method for removing shims 84f, there are a method of removing the shims 84f one by one as shown in FIG. 21A, and a method of removing the shims 84f by sizing up the cover cylinder 84a as shown in FIG. 21B. The method of removing the shims 84f as shown in FIG. 21B can remove the shims 84f without removing the piston 84c from the shaft 84d. When a mechanism for automatically unloading the shims 84f is installed, because there is no necessity of remove the cover cap 84d from the cover cylinder 84a, there is no necessity of purging the laser chamber 10 with the noble gas, or the like. This may be a preferable method.

5.6 Sixth Embodiment of Electrode Moving Mechanism

Figure 22A:
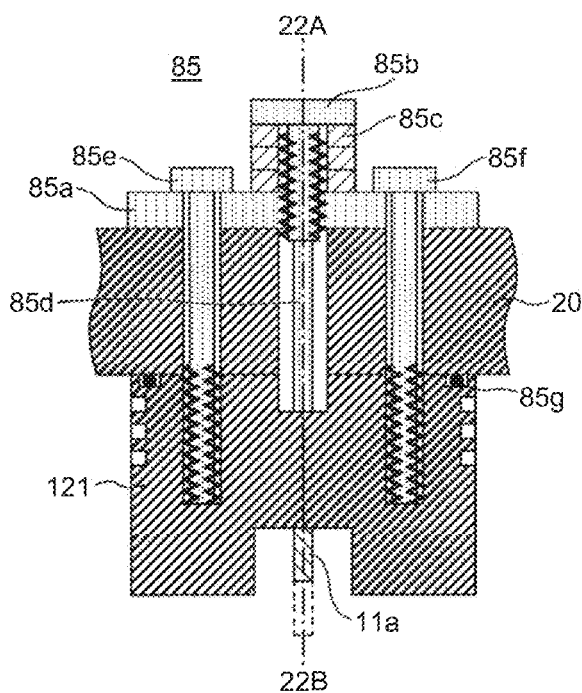
FIGS. 22A and 22B are first illustrations of an electrode moving mechanism according to a sixth embodiment.
Figure 22B:
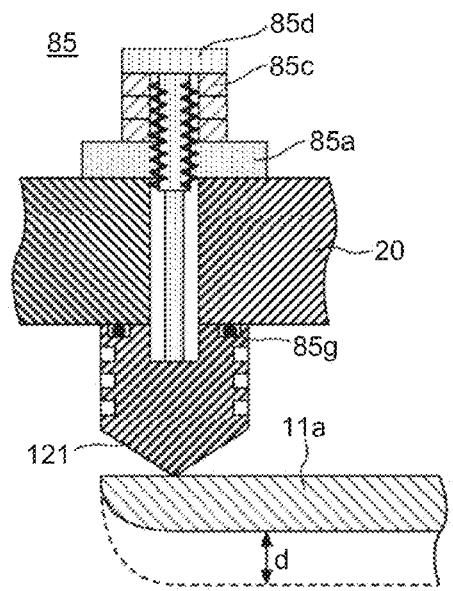

As shown in FIGS. 22A and 22B, the electrode moving mechanism for moving the first electrode 11a may be an electrode moving mechanism 85 using shims. Specifically, the electrode moving mechanism 85 may include a plate 85a, an extrusion bolt 85b, a plurality of shims 85c, a shaft 85d, fixing bolts 85e and 85f, and so forth. Between the insulator 20 and an insulator member 121, an O ring 85g may be arranged. FIG. 22A is a cross section view in a plane perpendicular to a longitudinal direction of the first electrode 11a, and FIG. 22B is a cross section view in a plane 22A-22B in FIG. 22A.

The plurality of shims 85c may be stacked, and the stacked shims 85c may be disposed between a head of the extrusion bolt 85b and the plate 85a. Each shim 85c may have a horseshoe shape, and an aperture may be formed thereat. The stacked shims 85c may be arranged so that an axle member (male screw) at which a screw thread of the extrusion bolt 85b is formed is arranged in the apertures of the shims 85c.

At the plate 85a, a female screw corresponding to the male screw of the extrusion bolt 85b may be formed. The male screw of the extrusion bolt 85b may be screwed in the female screw of the plate 85a. At the insulator member 121, female screws corresponding to axle members (the male screws) at which screw threads of the fixing bolt 85e and 85f are formed may be formed. The male screws of the fixing bolts 85e and 85f may be screwed in the female screws of the insulator member 121, respectively. The fixing bolts 85e and 85f may be made of insulator material.

Next, a method of extruding the first electrode 11a will be explained. When the first electrode 11a is abraded, firstly, at a state shown in FIGS. 22A and 22B, the laser chamber 10 may be purged by noble gas more than once, and the laser chamber 10 may be filled with noble gas till approximately atmospheric pressure.

Figure 23A:
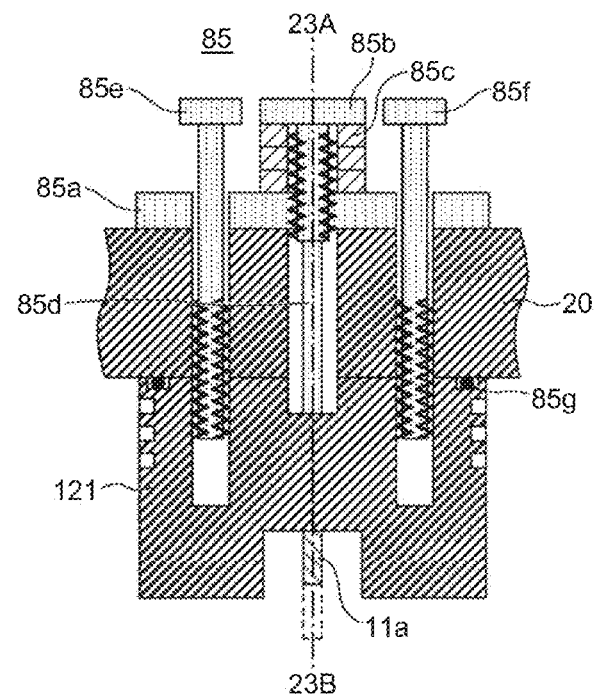
FIGS. 23A and 23B are second illustrations of the electrode moving mechanism according to the sixth embodiment.
Figure 23B:
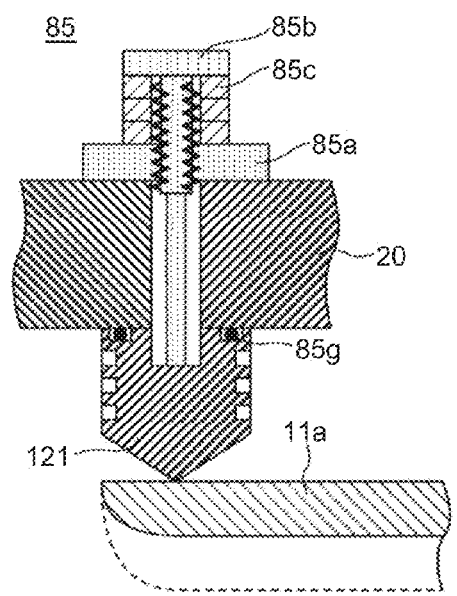

Then, as shown in FIGS. 23A and 23B, the fixing bolts 85e and 85f may be loosened. Specifically, heads of the fixing bolts 85e and 85f may be rotated in directions where the male screws of the fixing bolts 85e and 85f draw apart from the female screws of the insulator member 121, respectively. Thereby, the heads of the fixing bolts 85e and 85f may be floated from the plate 85a. FIG. 23A is a cross section view in a plane perpendicular to a longitudinal direction of the first electrode 11a, and FIG. 23B is a cross section view in a plane 23A-23B in FIG. 23A.

Figure 24A:
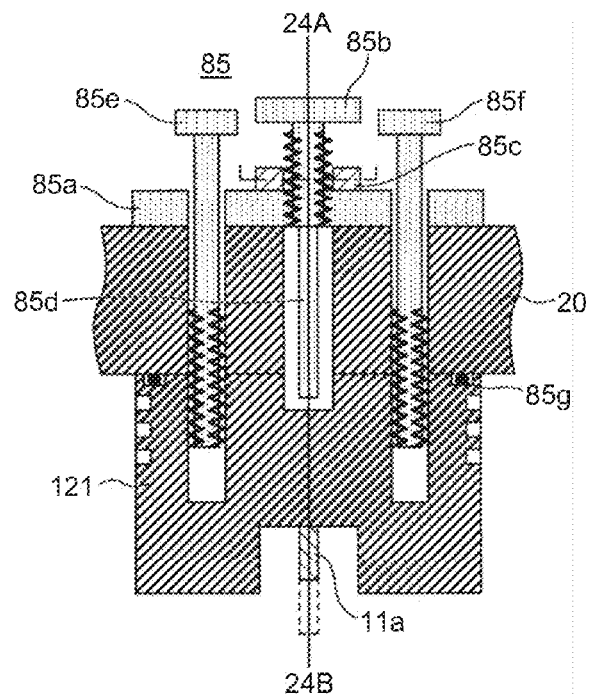
FIGS. 24A and 24B are third illustrations of the electrode moving mechanism according to the sixth embodiment.
Figure 24B:
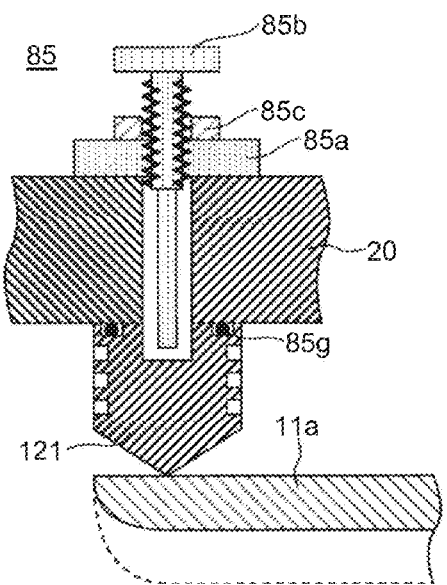
Figure 25:
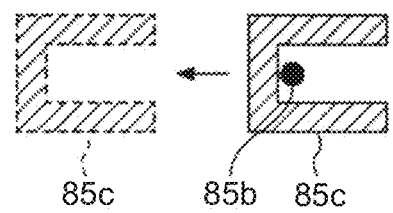
FIG. 25 is a fourth illustration of the electrode moving mechanism according to the sixth embodiment.

Then, as shown in FIGS. 24A, 24B and 25, the extrusion bolt 85b may be slightly loosened, and one or more shims 85c corresponding to a wear volume of the first electrode 11a may be removed. FIG. 24A is a cross section view in a plane perpendicular to a longitudinal direction of the first electrode 11a, and FIG. 24B is a cross section view in a plane 24A-24B in FIG. 24A. FIG. 25 is a cross section view in a plane 24C-24D in FIG. 24A.

Figure 26A:
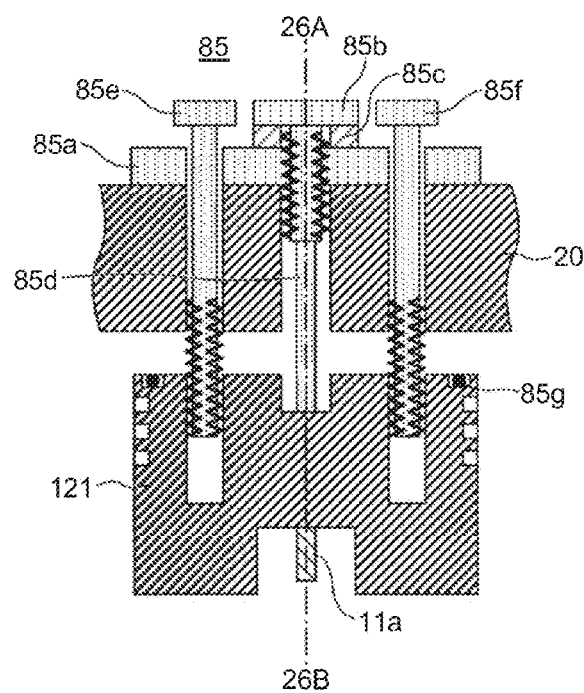
FIGS. 26A and 26B are fifth illustrations of the electrode moving mechanism according to the sixth embodiment.
Figure 26B:
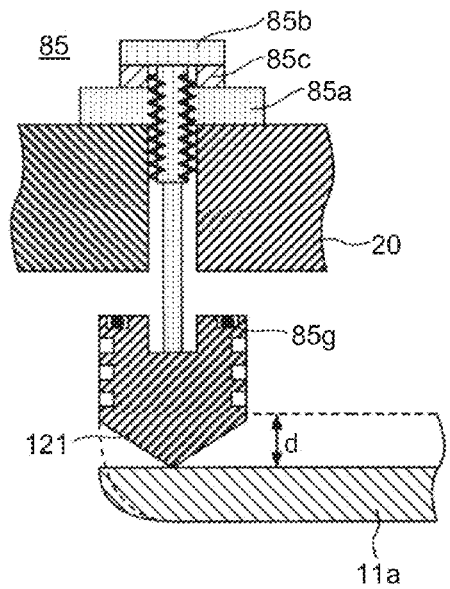

Then, as shown in FIGS. 26A and 26B, the extrusion bolt 85b may be clenched. Specifically, the extrusion bolt 85b may be clenched by rotating the head of the extrusion bolt 85b till the head of the extrusion bolt 85b contacts with the shim 85c. Thereby, the first electrode 11a may be extruded toward the side where the second electrode 11b is disposed so that the gap between the first electrode 11a and the second electrode 11b becomes a specific gap. FIG. 26A is a cross section view in a plane perpendicular to a longitudinal direction of the first electrode 11a, and FIG. 26B is a cross section view in a plane 26A-26B in FIG. 26A.

Figure 27A:
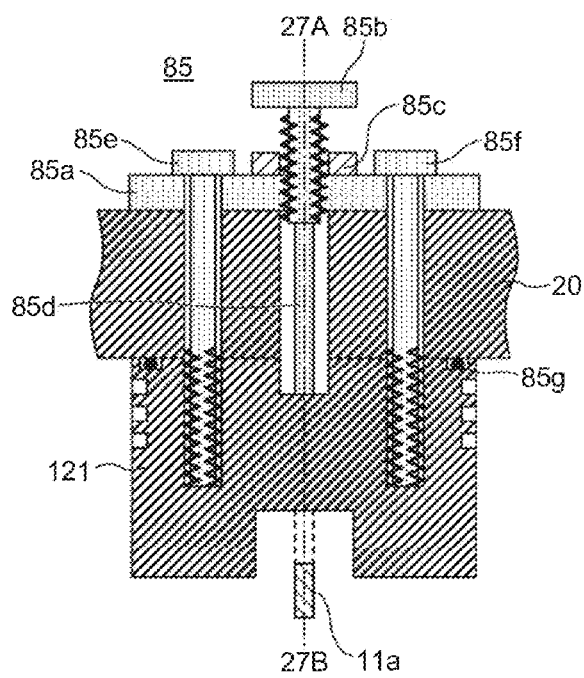
FIGS. 27A and 27B are sixth illustration of the electrode moving mechanism according to the sixth embodiment.
Figure 27B:
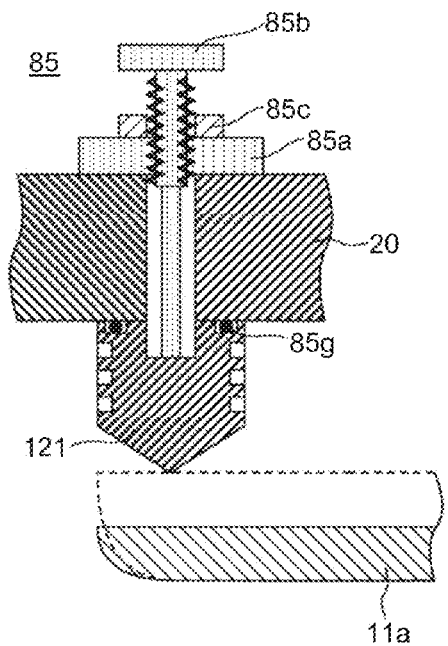

Then, as shown in FIGS. 27A and 27B, after the extrusion bolt 85b is clenched, the fixing bolts 85e and 85f may be clenched. FIG. 27A is a cross section view in a plane perpendicular to a longitudinal direction of the first electrode 11a, and FIG. 27B is a cross section view in a plane 27A-27B in FIG. 27A. After that, leakage from the laser chamber 10 may be checked, and the noble gas in the laser chamber 10 may be replaced with the laser gas with a specific pressure.

5.7 Seventh Embodiment of Electrode Moving Mechanism

Figure 28A:
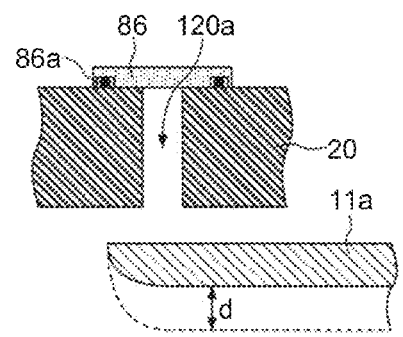
FIGS. 28A to 28C are first illustrations of an electrode moving mechanism according to a seventh embodiment.
Figure 29:
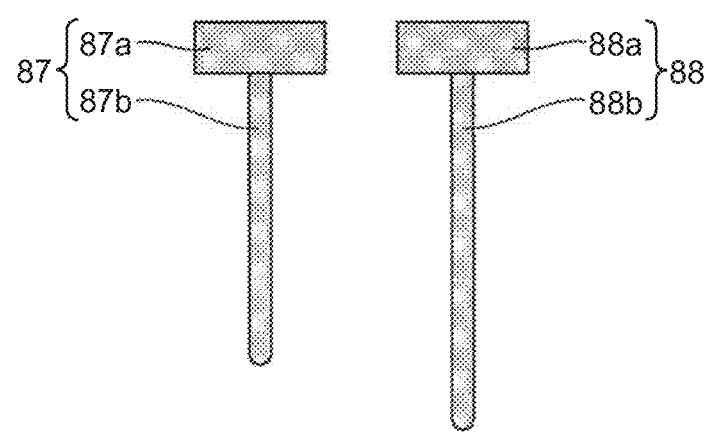
FIG. 29 is a second illustration of the electrode moving mechanism according to the seventh embodiment.

The electrode moving mechanism for moving the first electrode 11a may have a structure in which an aperture is formed at the insulator 20 and the first electrode 11a is extruded using an electrode extrusion jig. Specifically, as shown in FIG. 28A, an aperture 120a may be formed at the insulator 20, and the aperture 120a may be normally covered by a cap 86. Between the insulator 20 and the cap 86, an O ring 86a for sealing may be disposed, and the cap 86 may be fixed by a fixation mechanism (not shown) so that the aperture 120a is sealed by the cap 86a. The first electrode 11a may be extruded by electrode extrusion jigs 87 and 88 of which lengths are different from each other as shown in FIG. 29. The electrode extrusion jig 87 may include a head 87a and a shaft 87b, and the electrode extrusion jig 88 may include a head 88a and a shaft 88b. The length of the shaft 87b in the electrode extrusion jig 87 may be different from the length of the shaft 88b in the electrode extrusion jig 88.

When the first electrode 11a is abraded, firstly, at a state shown in FIG. 28A, the laser chamber 10 may be purged by noble gas more than once, and the laser chamber 10 may be filled with noble gas till approximately atmospheric pressure.

Figure 28B:
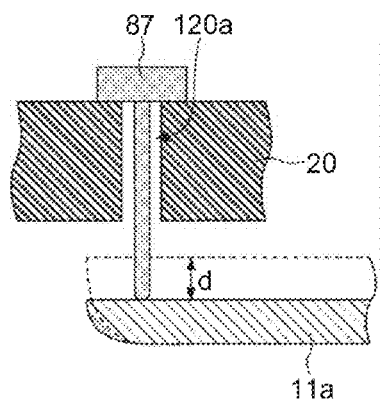

Then, as shown in FIG. 28B, the cap 86 may be removed, and by inserting a specific electrode extrusion jig, e.g., the shaft 87b of the electrode extrusion jig 87, into the laser chamber 10 via the aperture 120a, the first electrode 11a may be extruded by a length corresponding to a wear volume of the first electrode 11a.

Figure 28C:
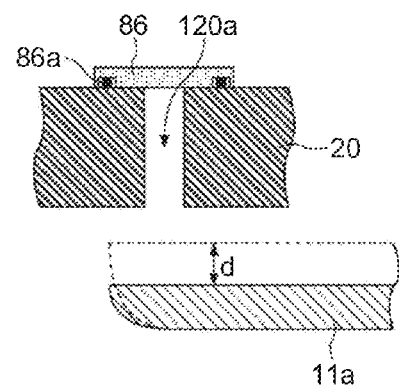

Then, as shown in FIG. 28C, after the first electrode 11a is extruded, the cap 86 may be mounted via the O ring 86a so that the aperture 120a is covered. After that, leakage from the laser chamber 10 may be checked, and the noble gas in the laser chamber 10 may be replaced with the laser gas with a specific pressure.

When the first electrode 11a is further abraded, by the same procedure, the first electrode 11a may be extruded using the electrode extrusion jig 88. The shaft of the electrode extrusion jig may be structured so that the length of the shaft can be adjusted.

5.8 Eighth Embodiment of Electrode Moving Mechanism

As shown in FIG. 30, the electrode moving mechanism for moving the first electrode 11a may be an electrode moving mechanism 89 using a clincher. Specifically, the electrode moving mechanism 89 may include a cover 89a, a clincher 89b, a plate 89c, and so forth. The clincher 89b may include a male screw (screw-threaded axle member) 89d and a shaft 89e which is a tip section than the male screw 89d. The tip of the shaft 89e may be joined to the insulator 73, or the like. The cover 89a may be fixed to the insulator 20 via an O ring 89f.

Figure 30A:
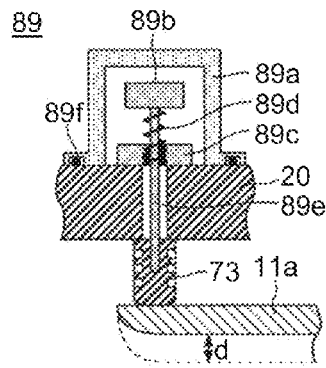
FIGS. 30A to 30C are illustrations of an electrode moving mechanism according to an eighth embodiment.

When the first electrode 11a is abraded, firstly, at a state shown in FIG. 30A, the laser chamber 10 may be purged by noble gas more than once, and the laser chamber 10 may be filled with noble gas till approximately atmospheric pressure.

Figure 30B:
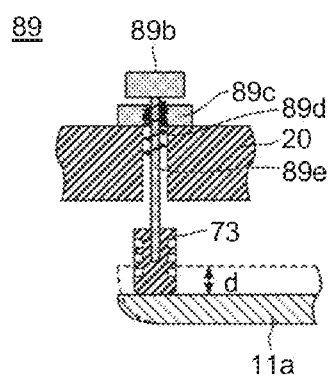

Then, as shown in FIG. 30B, the cover 89a may be removed, and by clenching the clincher 89b, the first electrode 11a may be extruded via the insulator 73, or the like, by a length corresponding to a wear volume of the first electrode 11a.

Figure 30C:
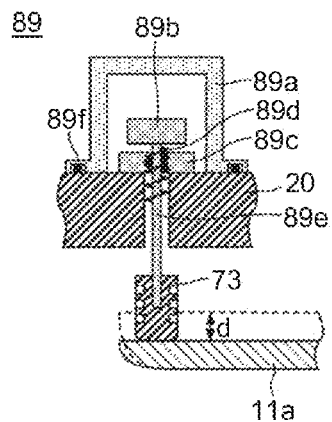

Then, as shown in FIG. 30C, after the first electrode 11a is extruded, the cover 89a may be mounted via the O ring 89f. After that, leakage from the laser chamber 10 may be checked, and the noble gas in the laser chamber 10 may be replaced with the laser gas with a specific pressure.

5.9 Ninth Embodiment of Electrode Moving Mechanism

Figure 31A:
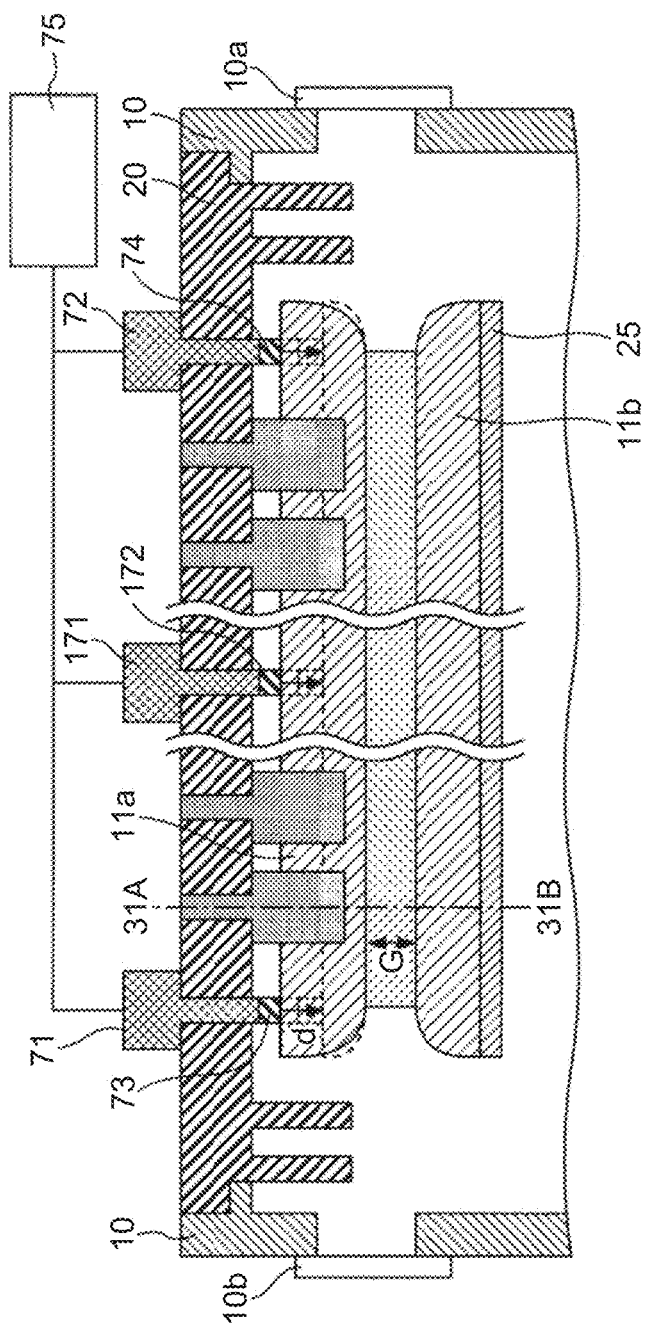
FIGS. 31A and 31B are illustrations of an electrode moving mechanism according to a ninth embodiment.
Figure 31B:
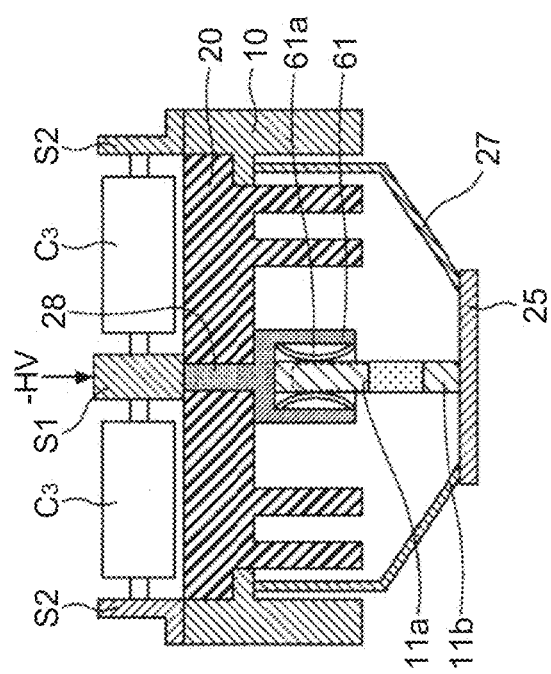

As shown in FIG. 31, three or more electrode moving mechanisms may be installed. For example, as shown in FIG. 31, electrode moving mechanisms 71 and 72 may be arranged at positions corresponding to ends of the first electrode 11a, respectively, and an electrode moving mechanism 171 may be arranged at a position corresponding to a center of the first electrode 11a. At a tip of the electrode moving mechanism 171, i.e., between the electrode moving mechanism 171 and the first electrode 11a, an insulator member 172 may be disposed. The electrode moving mechanism 171 may have the same structure as the electrode moving mechanism 71, or the like, and the insulator member 172 may have the same structure as the insulator member 73, or the like.

When the first electrode 11a is long in the longitudinal direction, by extruding the first electrode 11a using the two electrode moving mechanisms 71 and 72, the first electrode 11a may be bent at a middle of the first electrode 11a, and therefore, the gap between the first electrode 11a and the second electrode 11b may not be even. By extruding the first electrode 11a using three or more electrode moving mechanisms, it is possible to extrude the first electrode 11a without bending the first electrode 11a. Thereby, it is possible to even out the gap between the first electrode 11a and the second electrode 11b by extruding the first electrode 11a toward the side where the second electrode 11b is disposed.

Figure 32:
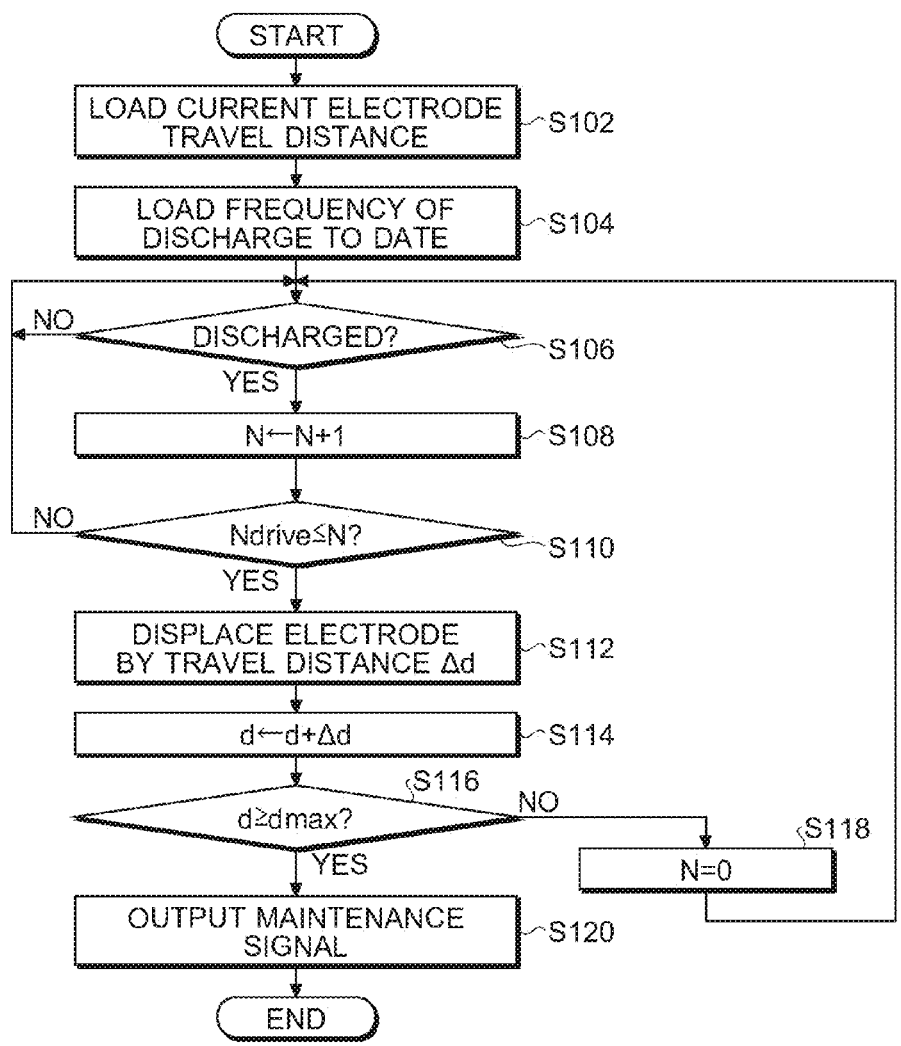
FIG. 32 is a flowchart for explaining a first control method of the laser apparatus according to the disclosure.

6. Control Method of Laser Apparatus 6.1 First Control Method of Laser Apparatus Using FIG. 32, a control method of the laser apparatus, in particular, a method of moving an electrode in the laser apparatus, will be explained. The number of discharges and a wear volume of an electrode may have an approximate proportionate relationship. Therefore, according to the method, the electrode may be moved based on the number of discharges.

Firstly, in step S102, the controller 30 may load a travel distance of the first electrode 11a, or the like, currently installed in the laser chamber 10, and define the loaded travel distance as a travel distance d. Specifically, when the first electrode 11a installed in the laser chamber 10 has been moved toward the side where the second electrode 11b is disposed, the controller 30 may load a travel distance of the first electrode 11a, and define the loaded travel distance as d. When the first electrode 11a has not been moved toward the side where the second electrode 11b is disposed, the controller 30 may define the travel distance d as 0 (d=0).

Then, in step S104, the controller 30 may load the number of discharges at a current position of the first electrode 11a, or the like, and define the loaded number of discharges as N. When the first electrode 11a has not been moved, the controller 30 may load the number of discharges from the beginning, and define the loaded number of discharges as N.

Then, in step S106, the controller 30 may apply a voltage between the first electrode 11a and the second electrode 11b in the laser chamber 10, and determine whether discharge occurs or not between the first electrode 11a and the second electrode 11b. When the controller 30 determines that the discharge occurs, the controller 30 may progress to step S108. On the other hand, when the controller 30 determines that the discharge does not occur, the controller 30 may execute step S106 again. The controller 30 may determine whether discharge occurs or not based on whether the trigger signal is transmitted to the switch 13a or not. Alternatively, the controller 30 may determine whether discharge occurs or not based on whether the energy monitor 17 detects a laser beam or not.

Then, in step S108, the controller 30 may define a new number of discharges N by incrementing the current number of discharges N by 1.

Then, in step S110, the controller 30 may determine whether a value of the number of discharges N is equal to or greater than an electrode moving and discharging number Ndrive or not. The electrode moving and discharging number Ndrive may be the number of discharges for determining that movement of the first electrode 11a, or the like, is required. When the controller 30 determines that a value of the number of discharges N is equal to or greater than the electrode moving and discharging number Ndrive, the controller 30 may progress to step S112. When the controller 30 determines that a value of the number of discharges N is not equal to or greater than the electrode moving and discharging number Ndrive, the controller 30 may return to step S106.

Then, in step S112, the controller 30 may move the first electrode 11a toward the side where the second electrode 11b is disposed by a travel distance Δd using the electrode moving mechanisms 71 and 72. The travel distance Δd may be a preset value defined as a travel distance for every movement of the first electrode 11a.

Then, in step S114, the controller 30 may define a new travel distance d by adding the travel distance Δd to the current travel distance d.

Then, in step S116, the controller 30 may determine whether the value of the travel distance d is equal to or greater than a maximum travel distance dmax or not. The maximum travel distance dmax may be a maximum value of the travel distance allowable for movement of the first electrode 11a, or the like. When the controller 30 determines that the value of the travel distance d is equal to or greater than the maximum travel distance dmax, the controller 30 may progress to step S120. When the controller 30 determines that the value of the travel distance d is not equal to or greater than the maximum travel distance dmax, the controller 30 may progress to step S118.

Then, in step S118, the controller 30 may define the number of discharges N as 0. After the number of discharges N is defined as 0, the controller 30 may return to step S106.

Then, in step S120, the controller 30 may transmit a signal indicating that maintenance is required. For example, when adjustment by moving the first electrode 11a, or the like, is at the edge of its capabilities, maintenance such as exchange of the laser chamber, or the like, is required. In such case, the controller 30 may transmit the signal indicating that maintenance such as exchange of the laser chamber, or the like, is required.

6.2 Second Control Method of Laser Apparatus

Figure 33:
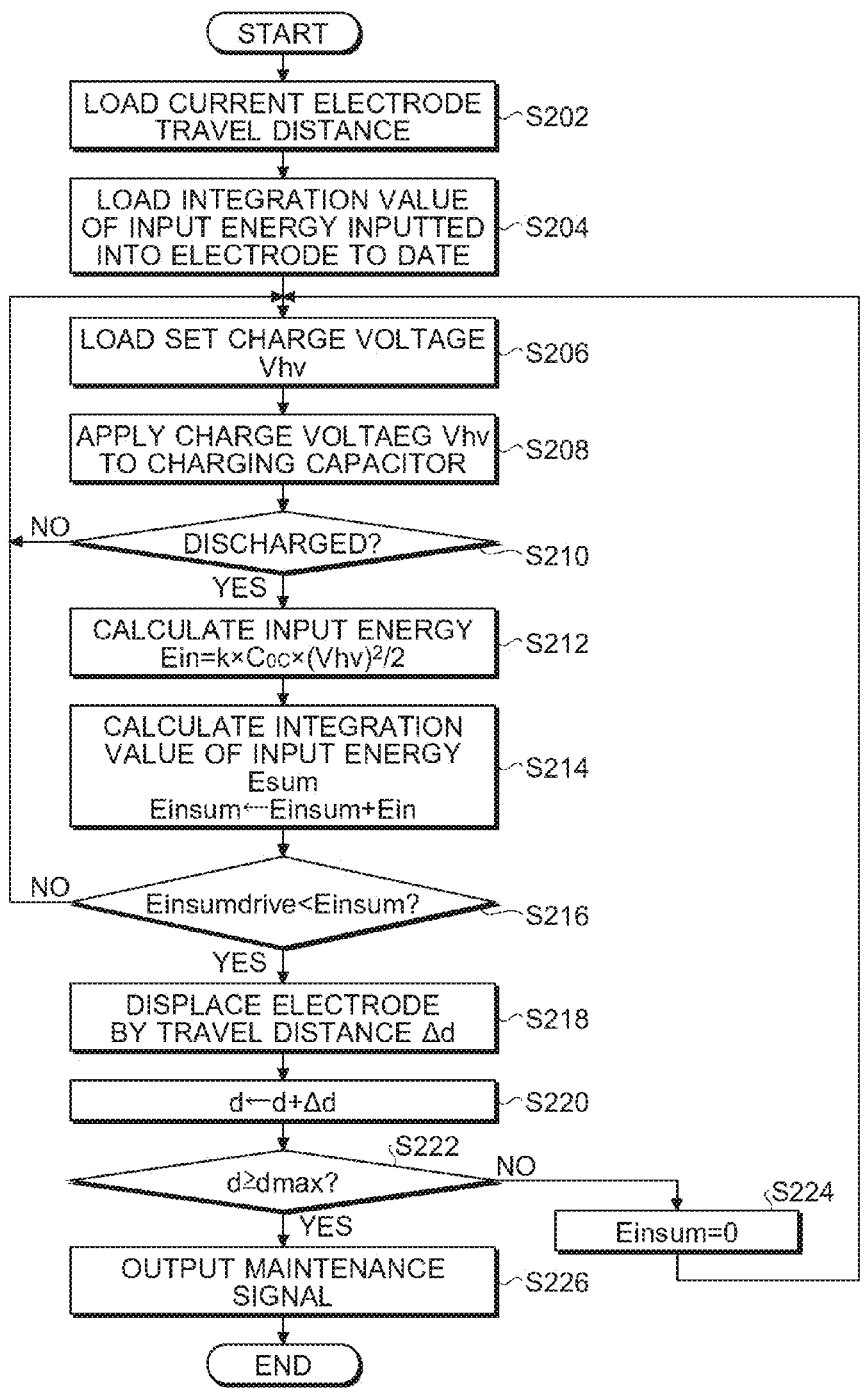
FIG. 33 is a flowchart for explaining a second control method of the laser apparatus according to the disclosure.

Using FIG. 33, a control method of the laser apparatus, in particular, a method of moving an electrode in the laser apparatus, will be explained. An integration value of input energy to a pair of electrodes and a wear volume of an electrode may have an approximate proportionate relationship. Therefore, according to the method, the electrode may be moved based on the integration value of input energy.

Firstly, in step S202, the controller 30 may load a travel distance of the first electrode 11a, or the like, currently installed in the laser chamber 10, and define the loaded travel distance as a travel distance d. Specifically, when the first electrode 11a installed in the laser chamber 10 has been moved toward the side where the second electrode 11b is disposed, the controller 30 may load a travel distance of the first electrode 11a, and define the loaded travel distance as d.

When the first electrode 11a has not been moved toward the side where the second electrode 11b is disposed, the controller 30 may define the travel distance d as 0 (d=0).

Then, in step S204, the controller 30 may load an integration value of input energy having been inputted between the first electrode 11a and the second electrode 11b, and define the loaded integration value of input energy as Einsum. The integration value of input energy having been inputted between the first electrode 11a and the second electrode 11b may be an integration value of input energy having been inputted between the first electrode 11a and the second electrode 11b till the laser chamber 10 is installed into the laser apparatus. In particular, there is a case where the first electrode 11a and the second electrode 11b have been used for discharging in another laser apparatus. When the first electrode 11a and the second electrode 11b have not been used for discharging, the controller 30 may define the integration value of input energy Einsum as 0 (Einsum=0).

Then, in step S206, the controller 30 may load a charge voltage Vhv set up in the charger 12.

Then, in step S208. the controller 30 may apply the voltage Vhv to the capacitor $C_0$ in the PPM 13 using the charger 12.

Then, in step S210, the controller 30 may apply a voltage between the first electrode 11a and the second electrode 11b in the laser chamber 10, and determine whether discharge occurs between the first electrode 11a and the second electrode 11b. When the controller 30 determines that the discharge occurs, the controller 30 may progress to step S212. On the other hand, when the controller 30 determines that the discharge does not occur, the controller 30 may execute step S206 again. The controller 30 may determine whether discharge occurs or not based on whether the trigger signal is transmitted to the switch 13a or not. Alternatively, the controller 30 may determine whether discharge occurs or not based on whether the energy monitor 17 detects a laser beam or not.

Then, in step S212, the controller 30 may calculate input energy Ein. Specifically, the controller 30 may calculate the input energy Ein based on the following formula (I). Here, k is a coefficient, and $C_{0C}$ is a capacitance of the capacitor $C_0$.

$$Ein = k \times C_{0C} \times (Vhv)^2 / 2 \qquad (1)$$

Then, in step S214, the controller 30 may calculate a new integration value of input energy Einsum by adding the input energy Ein calculated in step S212 to the currently stored integration value Einsum.

Then, in step S216, the controller 30 may determine whether the integration value of input energy Einsum exceeds an electrode moving input energy integration value Einsumdrive or not. The electrode moving input energy integration value Einsumdrive may be an integration value of input energy for determining that movement of the first electrode 11a, or the like, is required. When the controller 30 determines that the integration value of input energy Einsum exceeds the electrode moving input energy integration value Einsumdrive, the controller 30 may progress to step S218. On the other hand, when the controller 30 determines that the integration value of input energy Einsum does not exceed the electrode moving input energy integration value Einsumdrive, the controller 30 may return to step S206.

Then, in step S218, the controller 30 may move the first electrode 11a toward the side where the second electrode 11b is disposed by a travel distance Δd using the electrode moving mechanisms 71 and 72. The travel distance Δd may be a preset value defined as a travel distance for every movement of the first electrode 11a.

Then, in step S220, the controller 30 may define a new travel distance d by adding the travel distance Δd to the current travel distance d.

Then, in step S222, the controller 30 may determine whether the value of the travel distance d is equal to or greater than a maximum travel distance dmax or not. The maximum travel distance dmax may be a maximum value of the travel distance allowable for movement of the first electrode 11a, or the like. When the controller 30 determines that the value of the travel distance d is equal to or greater than the maximum travel distance dmax, the controller 30 may progress to step S226. When the controller 30 determines that the value of the travel distance d is not equal to or greater than the maximum travel distance dmax, the controller 30 may progress to step S224.

Then, in step S224, the controller 30 may define the integration value of input energy Einsum as 0. After the integration value of input energy Einsum is defined as 0, the controller 30 may return to step S206.

Then, in step S226, the controller 30 may transmit a signal indicating that maintenance is required. For example, when adjustment by moving the first electrode 11a, or the like, is at the edge of its capabilities, maintenance such as exchange of the laser chamber, or the like, is required. In such case, the controller 30 may transmit the signal indicating that maintenance such as exchange of the laser chamber, or the like, is required.

6.3 Third Control Method of Laser Apparatus

Figure 34:
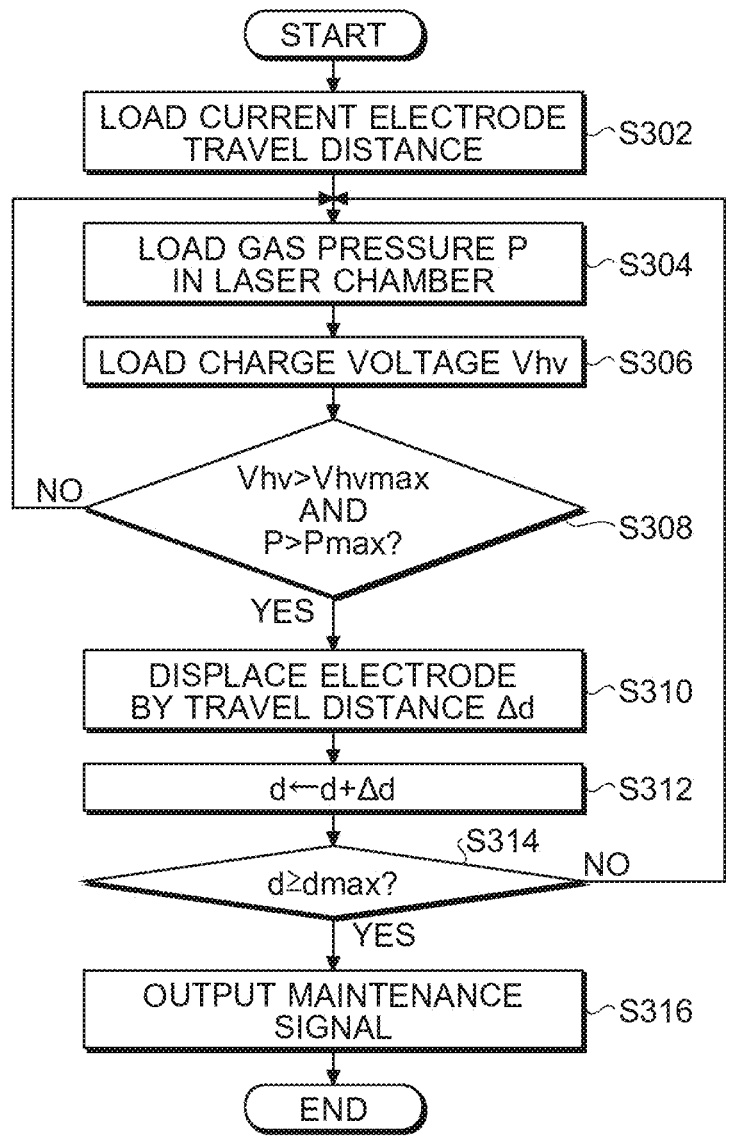
FIG. 34 is a flowchart for explaining a third control method of the laser apparatus according to the disclosure.

Using FIG. 34, a control method of the laser apparatus, in particular, a method of moving an electrode in the laser apparatus, will be explained. When electrodes is abraded by discharging, pulse energy of laser beams may be reduced under the conditions of the same gas pressure in the laser chamber 10 and the same charge voltage. Even when the pulse energy of laser beams is reduced, by increasing pulse energy by increasing the charge voltage and/or the gas pressure in the laser chamber 10, it is possible to obtain desired pulse energy. However, when an electrode is abraded more than a certain volume, the desired pulse energy may not be obtained even when the charge voltage and/or the gas pressure in the laser chamber 10 are increased. In the method, an electrode may be moved when the charge voltage and the gas pressure in the laser chamber 10 exceed certain values.

Firstly, in step S302, the controller 30 may load a travel distance of the first electrode 11a, or the like, currently installed in the laser chamber 10, and define the loaded travel distance as a travel distance d. Specifically, when the first electrode 11a installed in the laser chamber 10 has been moved toward the side where the second electrode 11b is disposed, the controller 30 may load a travel distance of the first electrode 11a, and define the loaded travel distance as d. When the first electrode 11a has not been moved toward the side where the second electrode 11b is disposed, the controller 30 may define the travel distance d as 0 (d=0).

Then, in step S304, the controller 30 may load a gas pressure P in the laser chamber 10 measured by the pressure sensor 16.

Then, in step S306, the controller 30 may load a charge voltage Vhv set up in the charger 12 in order to discharge between the first electrode 11a and the second electrode 11b.

Then, in step S308, the controller 30 may determine whether the charge voltage Vhv exceeds a maximum charge voltage Vhvmax or not and the gas pressure P in the laser chamber 10 exceeds a maximum gas pressure Pmax or not. The maximum charge voltage Vhvmax may be a maximum value of the charge voltage capable of being supplied by the charger 12, and the maximum gas pressure Pmax may be a maximum value of the gas pressure in the laser chamber 10 capable of outputting laser beams with a desired pulse energy. When the controller 30 determines that the charge voltage Vhv exceeds the maximum charge voltage Vhvmax and the gas pressure P in the laser chamber 10 exceeds the maximum gas pressure Pmax, the controller 30 may progress to step S310. When the controller 30 determines that the charge voltage Vhv does not exceed the maximum charge voltage Vhvmax or the gas pressure P in the laser chamber 10 does not exceed the maximum gas pressure Pmax, the controller 30 may return to step S304.

Then, in step S310, the controller 30 may move the first electrode 11a toward the side where the second electrode 11b is disposed by a travel distance Δd using the electrode moving mechanisms 71 and 72. The travel distance Δd may be a preset value defined as a travel distance for every movement of the first electrode 11a.

Then, in step S312, the controller 30 may define a new travel distance d by adding the travel distance Δd to the current travel distance d.

Then, in step S314, the controller 30 may determine whether the value of the travel distance d is equal to or greater than a maximum travel distance dmax or not. The maximum travel distance dmax may be a maximum value of the travel distance allowable for movement of the first electrode 11a, or the like. When the controller 30 determines that the value of the travel distance d is equal to or greater than the maximum travel distance dmax, the controller 30 may progress to step S316. When the controller 30 determines that the value of the travel distance d is not equal to or greater than the maximum travel distance dmax, the controller 30 may return to step S304.

Then, in step S316, the controller 30 may transmit a signal indicating that maintenance is required. For example, when adjustment by moving the first electrode 11a, or the like, is at the edge of its capabilities, maintenance such as exchange of the laser chamber, or the like, is required. In such case, the controller 30 may transmit the signal indicating that maintenance such as exchange of the laser chamber, or the like, is required.

6.4 Fourth Control Method of Laser Apparatus

Using FIG. 35, a control method of the laser apparatus, in particular, a method of moving an electrode in the laser apparatus, will be explained. In the method, an electrode may be moved based on a gas pressure in the laser chamber 10, a charge voltage and an energy stability of laser beams.

Firstly, in step S402, the controller 30 may load a travel distance of the first electrode 11a, or the like, currently installed in the laser chamber 10, and define the loaded travel distance as a travel distance d. Specifically, when the first electrode 11a installed in the laser chamber 10 has been moved toward the side where the second electrode 11b is disposed, the controller 30 may load a travel distance of the first electrode 11a, and define the loaded travel distance as d. When the first electrode 11a has not been moved toward the side where the second electrode 11b is disposed, the controller 30 may define the travel distance d as 0 (d=0).

Then, in step S404, the controller 30 may define the number of discharges i as 1.

Then, in step S406, the controller 30 may load a gas pressure P in the laser chamber 10 measured by the pressure sensor 16.

Then, in step S408, the controller 30 may load a charge voltage Vhv set up in the charger 12 in order to discharge between the first electrode 11a and the second electrode 11b.

Then, in step S410, the controller 30 may apply a voltage between the first electrode 11a and the second electrode 11b in the laser chamber 10, and determine whether discharge occurs between the first electrode 11a and the second electrode 11b or not. When the controller 30 determines that the discharge occurs, the controller 30 may progress to step 412. On the other hand, when the controller 30 determines that the discharge does not occur, the controller 30 may execute step S406 again. The controller 30 may determine whether discharge occurs or not based on whether the trigger signal is transmitted to the switch 13a or not. Alternatively, the controller 30 may determine whether discharge occurs or not based on whether the energy monitor 17 detects a laser beam or not.

Then, in step S412, the controller 30 may calculate pulse energy E of an outputted laser beam based on energy of the laser beam measured by the optical sensor 17c.

Then, in step S414, the controller 30 may define the pulse energy E measured in step S412 as pulse energy $E_i$.

Then, in step S416, the controller 30 may define a new number of discharges i by incrementing the current number of discharges i by 1.

Then, in step S418, the controller 30 may determine whether a value of the number of discharges i is equal to or greater than a specific number of discharges n or not. When the controller 30 determines that a value of the number of discharges i is equal to or greater than the specific number of discharges n, the controller 30 may progress to step 420. When the controller 30 determines that a value of the number of discharges N is not equal to or greater than the specific number of discharges n, the controller 30 may return to step S406.

Then, in step S420, the controller 30 may calculate a standard deviation σ of pulse energy and an average value Eav of pulse energy of laser beams under pulse energies $E_1$, $E_2$, ..., $E_n$ based on the number of discharges n and the pulse energy $E_1$, $E_2$, ..., $E_n$.

Then, in step S422, the controller 30 may calculate the energy stability Es of laser beams Es based on Es=σ/Eav.

Then, in step S424, the controller 30 may determine whether the gas pressure P exceeds a specific gas pressure Pmaxs or not, whether the charge voltage Vhv exceeds a specific charge voltage Vhvmaxs or not, and whether the energy stability Es exceeds a specific energy stability Esmaxs or not. When the first electrode 11a is abraded, the energy stability of pulse energy of outputted laser beams may be degraded. However, even when the energy stability is degraded, by adjusting the gas pressure P in the laser chamber 10 and the charge voltage Vhv, the energy stability can be improved. Therefore, when the gas pressure P exceeds the specific gas pressure Pmaxs, the charge voltage Vhv exceeds the specific charge voltage Vhvmaxs, and the energy stability Es exceeds the specific energy stability Esmaxs, the controller 30 may progress to step S426. When the gas pressure P does not exceed the specific gas pressure Pmaxs, the charge voltage Vhv does not exceed the specific charge voltage Vhvmaxs, and the energy stability Es does not exceed the specific energy stability Esmaxs, the controller 30 may return to step S404. Here, the specific gas pressure Pmaxs may be a maximum value of the gas pressure for outputting stable energy laser beams.

Then, in step S426, the controller 30 may move the first electrode 11a toward the side where the second electrode 11b is disposed by a travel distance Δd using the electrode moving mechanisms 71 and 72. The travel distance Δd may be a preset value defined as a travel distance for every movement of the first electrode 11a.

Then, in step S428, the controller 30 may define a new travel distance d by adding the travel distance Δd to the current travel distance d.

Then, in step S430, the controller 30 may determine whether the value of the travel distance d is equal to or greater than a maximum travel distance dmax or not. The maximum travel distance dmax may be a maximum value of the travel distance allowable for movement of the first electrode 11a, or the like. When the controller 30 determines that the value of the travel distance d is equal to or greater than the maximum travel distance dmax, the controller 30 may progress to step S432. When the controller 30 determines that the value of the travel distance d is not equal to or greater than the maximum travel distance dmax, the controller 30 may return to step S406.

Then, in step S432, the controller 30 may transmit a signal indicating that maintenance is required. For example, when adjustment by moving the first electrode 11a, or the like, is at the edge of its capabilities, maintenance such as exchange of the laser chamber, or the like, is required. In such case, the controller 30 may transmit the signal indicating that maintenance such as exchange of the laser chamber, or the like, is required.

Figure 35:
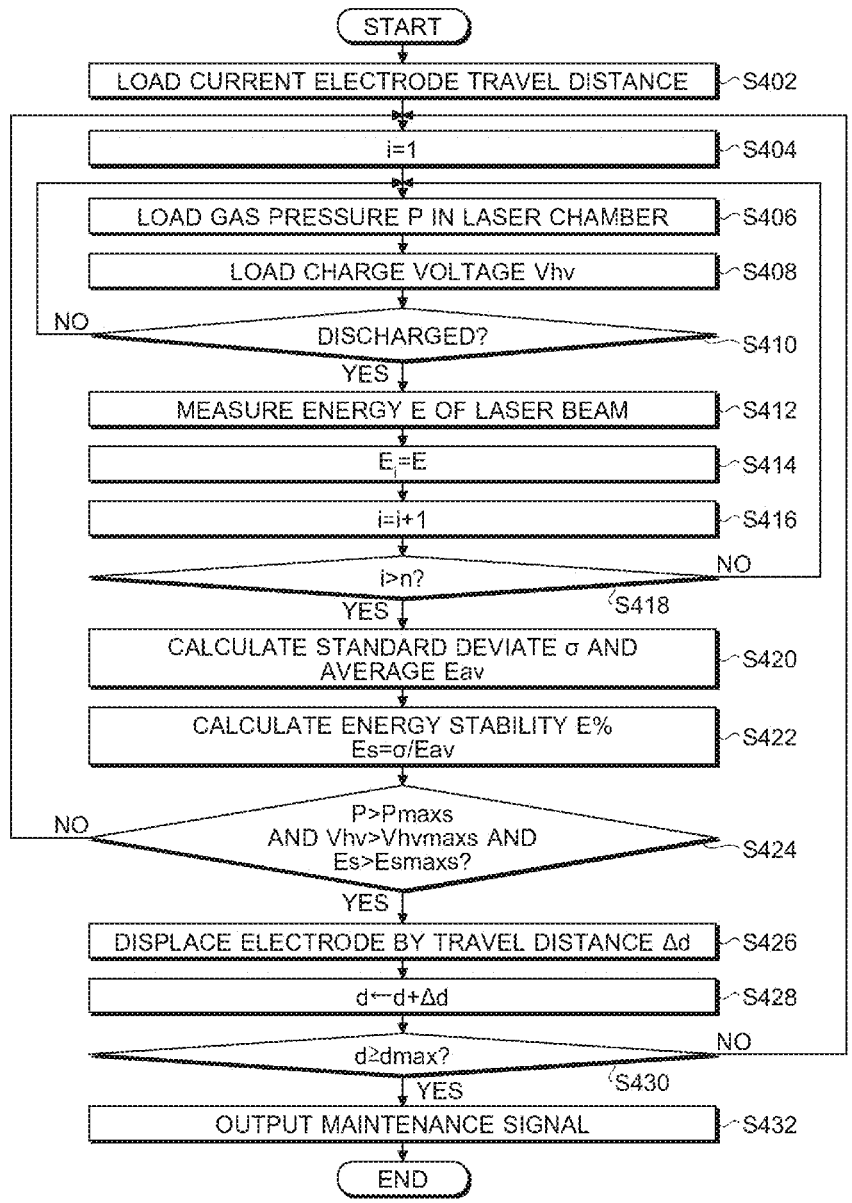
FIG. 35 is a flowchart for explaining a fourth control method of the laser apparatus according to the disclosure.

According to the method shown in FIG. 35, because the first electrode 11a is moved with consideration of not only the pulse energy of laser beams but also the energy stability, it is possible to output fine laser beams. Regarding a relationship between the method shown in FIG. 35 and the method shown in FIG. 34, normally, Pmaxs may be smaller than Pmax (Pmaxs<Pmax), and Vhvmaxs may be equal to or smaller than Vhvmax (Vhvmaxs≤Vhvmax). This is because degradation of the energy stability Es of laser beams may occur earlier than reduction of pulse energy of laser beams.

Although the case where the first electrode 11a is moved is explained in the above-descriptions, the second electrode 11b may be moved by the same methods. Furthermore, both the first electrode 11a and the second electrode 11b may be moved.

7. Supplemental Explanations
7.1 Pulse Power Module

Figure 36:
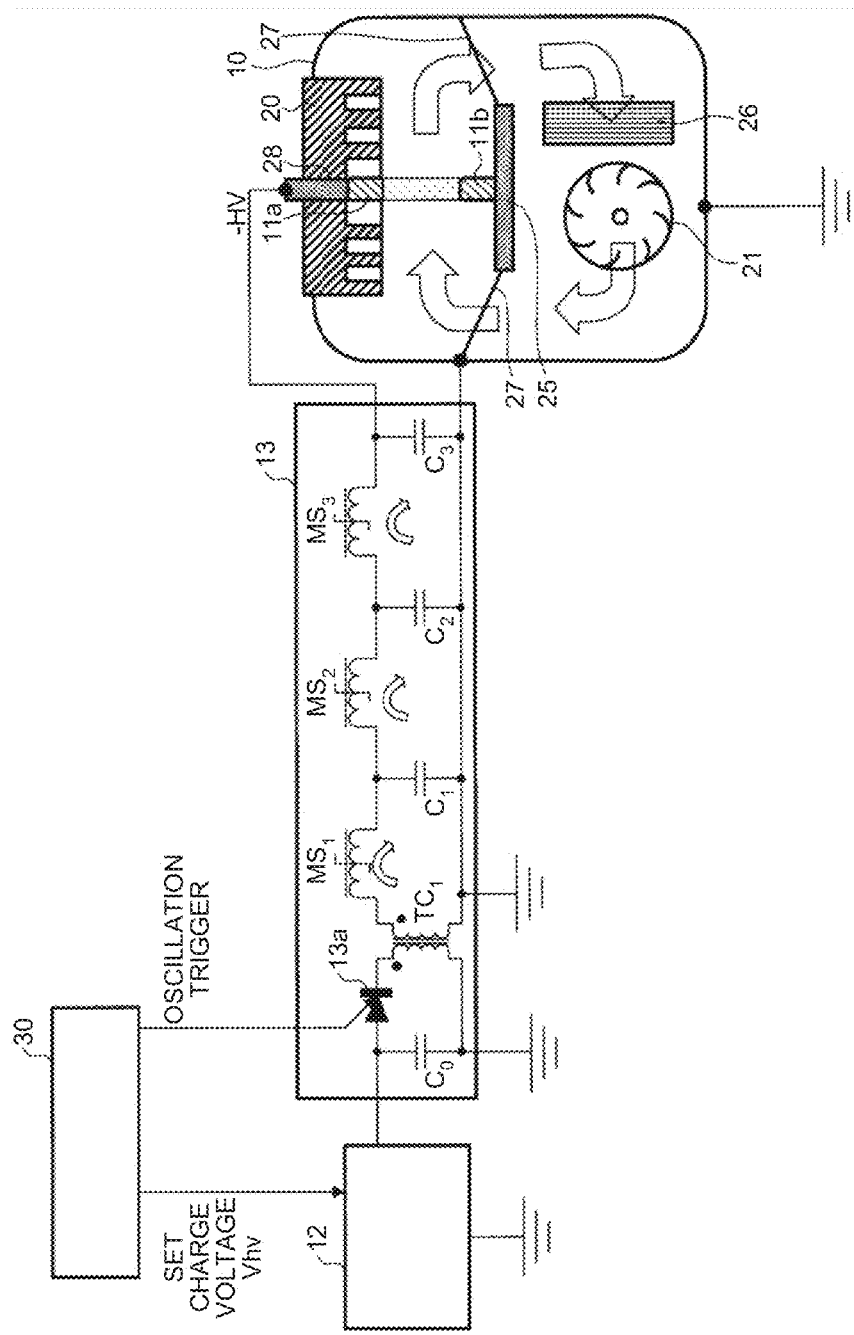
FIG. 36 is a structural diagram of another pulse power module used for the laser apparatus according to the disclosure.

As shown in FIG. 36, in the transformer $TC_1$ of the PPM 13, directions of windings in the primary side and the secondary side may be the same. Specifically, although the case where directions of windings in the primary side and the secondary side in the transformer $TC_1$ of the PPM 13 shown in FIG. 2 are opposed is explained, the directions of the windings in the primary side and the secondary side may be the same. In such case, a positive high voltage +HV may be applied to the first electrode 11a.

7.2 Laser Chamber

Figure 37A:
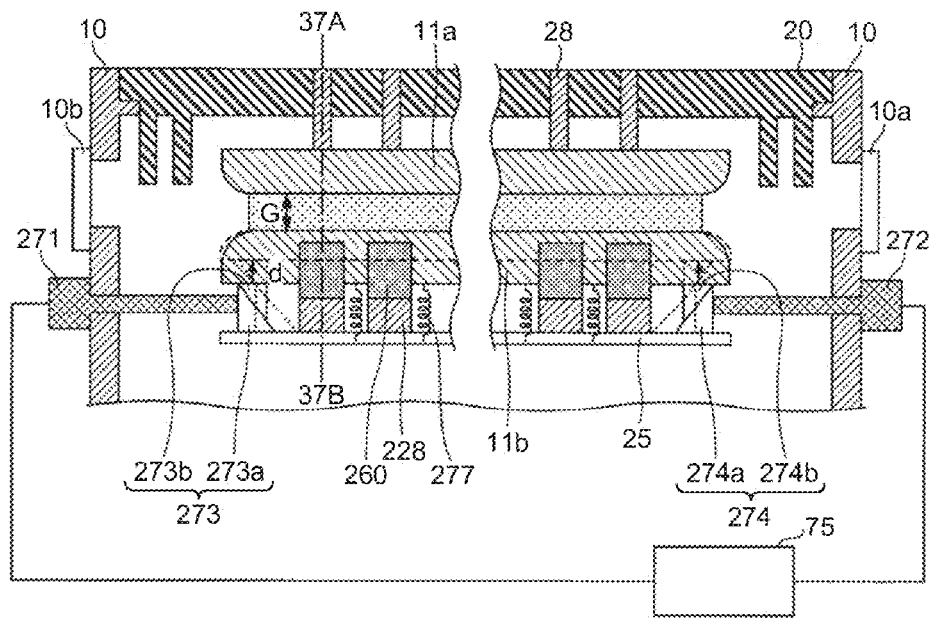
FIGS. 37A and 37B are structural diagrams of another laser chamber used for the laser apparatus according to the disclosure.
Figure 37B:
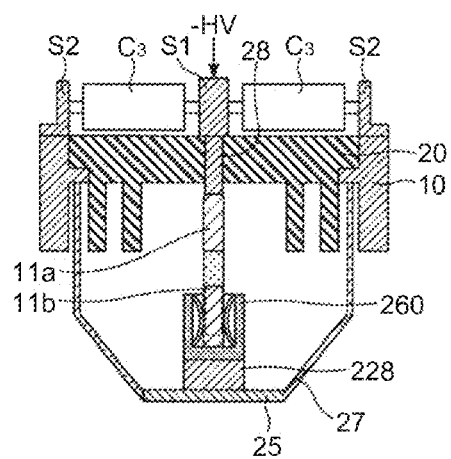

As shown in FIG. 37, in the laser chamber 10, the second electrode 11b may be moved upward. FIGS. 37A and 37B are cross section views showing major portions of the laser chamber 10, FIG. 37A is a cross section view of the laser chamber 10 in the same plane as in FIG. 1, and FIG. 37B is a cross section view in a plane 37A-37B in FIG. 37A.

Specifically, the second electrode 11b may be electrically connected to a current introduction terminal 228 via a connector 260. Electrode moving mechanisms 271 and 272 connected to the driver 75 may be installed, a slider 273 may be arranged at a tip of the electrode moving mechanism 271, and a slider 274 may be arranged at a tip of the electrode moving mechanism 272. The slider 273 may be structured by a first block 273a and a second block 273b, and the slider 274 may be structured by a first block 274a and a second block 274b. By driving the electrode moving mechanisms 271 and 272, the first blocks 273a and 274a may be extruded inward, and thereby, the second blocks 273a and 274a may be moved upward. By moving the second blocks 273b and 274b upward, the second electrode 11b may be extruded toward the side where the first electrode 11a is disposed. Furthermore, to the second electrode 11b, a spring 277 biasing in a direction away from the first electrode 11a may be arranged.

The above-described embodiments and the modifications thereof are merely examples for implementing the present disclosure, and the present disclosure is not limited thereto. Making various modifications according to the specifications or the like is within the scope of the present disclosure, and other various embodiments are possible within the scope of the present disclosure. For example, the modifications illustrated for particular embodiments can be applied to other embodiments as well (including the other embodiments described herein).

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as "at least one" or "one or more."

What is claimed is:

1. A laser apparatus comprising:
   a laser chamber including a laser gain medium, and a part of the laser chamber being constructed by an insulator;
   a power source;
   a first electrode to which a voltage is applied from the power source and a second electrode that is grounded, the first and second electrodes being disposed in the laser chamber, and the first electrode being disposed at a side where the insulator is disposed;
   a connector connected to the power source, and supporting the first electrode in a way that allows the first electrode to move toward a side where the second electrode is disposed; and
   an electrode moving mechanism being installed in the insulator and being connected to the first electrode to move the first electrode toward the side where the second electrode is disposed,
   wherein the electrode moving mechanism comprises shims which are stacked and removed corresponding to a wear volume of the first electrode.

2. The laser apparatus according to claim 1, wherein a part contacting with the first electrode in the connector is made of elastic metal.

3. The laser apparatus according to claim 1, wherein the connector includes an elastic member therein that is made of metal.

4. The laser apparatus according to claim 1, wherein
   the connector contacts with the first electrode at a plurality of parts, and
   each of the parts contacting with the first electrode is made of elastic metal.

5. The laser apparatus according to claim 1, wherein
   the connector is fixed to the insulator.

6. The laser apparatus according to claim 1, further comprising an insulator member disposed between the electrode moving mechanism and the first electrode.

7. The laser apparatus according to claim 1, wherein a part of the electrode moving mechanism and the first electrode are joined to each other.

8. The laser apparatus according to claim 1, further comprising:
   a controller configured to control the electrode moving mechanism so that the first electrode moves at a specific timing.

9. The laser apparatus according to claim 8, wherein the specific timing is arranged based on the number of discharges between the first electrode and the second electrode, or a charge voltage for applying a voltage between the first electrode and the second electrode.

* * * * *